United States Patent [19]
Nassimi

[11] Patent Number: 5,790,102
[45] Date of Patent: Aug. 4, 1998

[54] PRESSURE SENSITIVE COMPUTER MOUSE

[76] Inventor: Shary Nassimi, 2002 NW. 215 Cir., Ridgefield, Wash. 98642

[21] Appl. No.: 623,924

[22] Filed: Mar. 28, 1996

[51] Int. Cl.$^6$ ............................................. G09G 5/08
[52] U.S. Cl. .............................. 345/163; 345/157; 463/37
[58] Field of Search .......................... 345/156, 157, 345/161, 163, 164, 167, 159, 145; 74/471 XY; 463/37, 38; 273/148 B; 200/5 R, 5 A, 6 A, 6 R; 341/34; D14/114

[56] References Cited

U.S. PATENT DOCUMENTS

| | | | |
|---|---|---|---|
| 4,408,103 | 10/1983 | Smith, III | 200/5 A |
| 4,488,017 | 12/1984 | Lee | 345/161 |
| 4,769,517 | 9/1988 | Swinney | 345/161 |
| 4,931,781 | 6/1990 | Miyakawa | 345/160 |
| 5,184,120 | 2/1993 | Schultz | 340/870.38 |
| 5,217,781 | 6/1993 | Kuipers | 428/85 |
| 5,252,971 | 10/1993 | Franz et al. | 345/168 |
| 5,260,696 | 11/1993 | Maynard, Jr. | 345/157 |
| 5,268,675 | 12/1993 | Garthwaite et al. | 345/163 |
| 5,355,148 | 10/1994 | Anderson | 345/166 |
| 5,510,812 | 4/1996 | O'Mara et al. | 345/161 |

*Primary Examiner*—Lun-Yi Lao
*Attorney, Agent, or Firm*—Richard L. Miller, P.E.

[57] ABSTRACT

A pressure sensitive computer mouse that includes a hollow computer mouse housing and cursor moving apparatus. The hollow computer mouse housing has a bottom with a circular throughbore and an inner surface. And, the cursor moving apparatus is responsive to a force of a specific magnitude and of a specific direction that is applied to the hollow housing and moves the computer cursor in the specific direction of which the force is applied to the hollow housing at a specific speed which is directly proportional to, or at least a function of, the specific magnitude of the force being applied to the hollow computer mouse housing without moving the hollow computer mouse housing relative to a surface on which the bottom of the hollow computer mouse housing is in contact therewith.

47 Claims, 4 Drawing Sheets

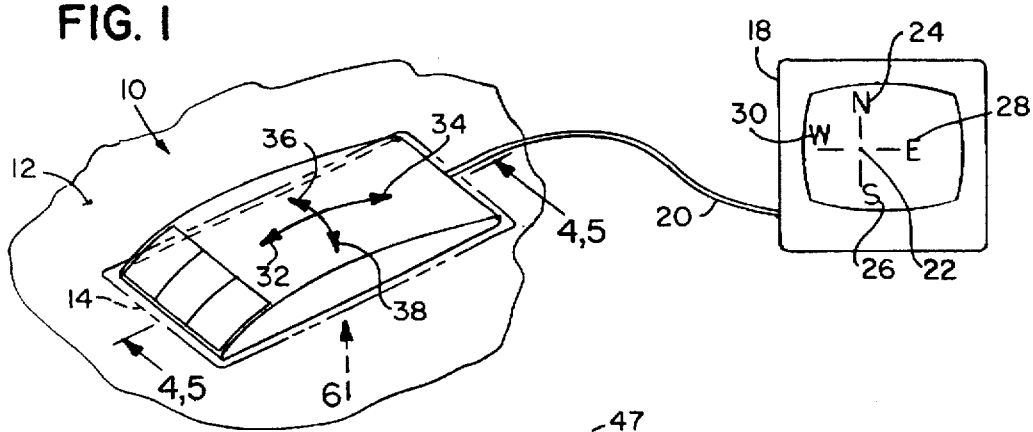
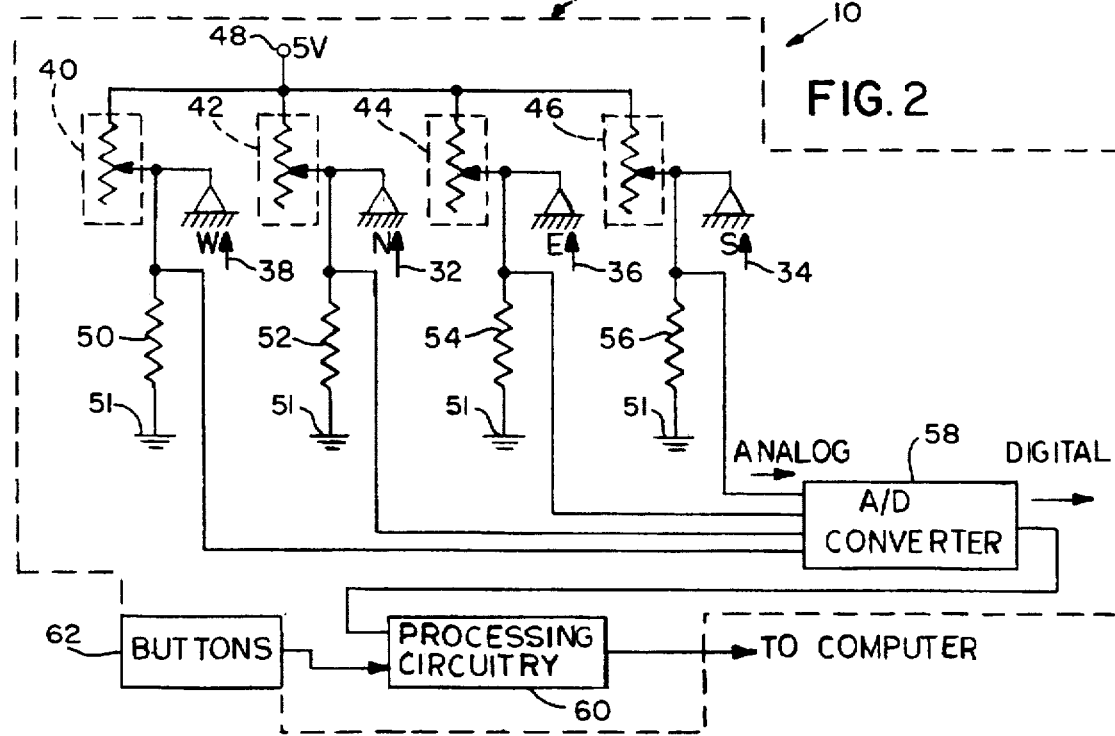
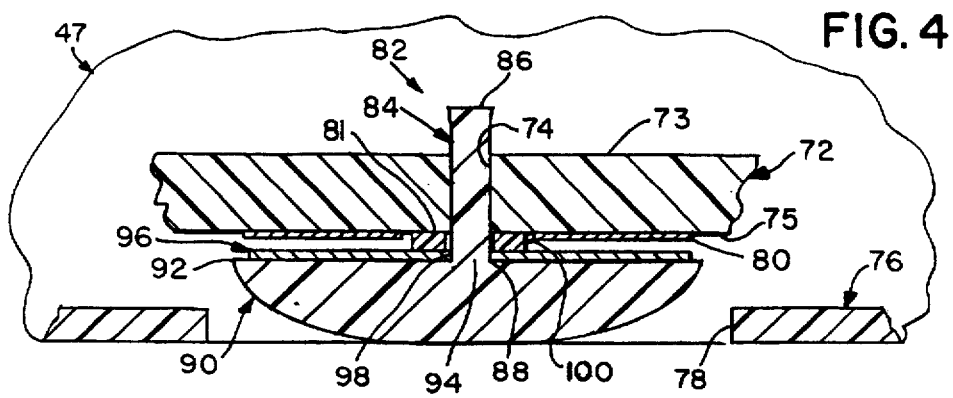

PRESSURE SENSITIVE COMPUTER MOUSE

CROSS REFERENCES TO RELATED APPLICATIONS

The instant application contains subject matter disclosed in applicant's Disclosure Document No. 372798 filed on Mar. 22, 1995. As such, it is respectfully requested that this Disclosure Document be relied upon and remain a permanent part of the file history during the prosecution of the instant application and during any subsequent action thereof.

BACKGROUND OF THE INVENTION

The present invention relates to a pressure sensitive computer mouse. More particularly, the present invention relates to a pressure sensitive computer mouse that includes quadrangularly-spaced pressure sensors.

Numerous innovations for computer devices have been provided in the prior art that will be described. Even though these innovations may be suitable for the specific individual purposes to which they address, however, they differ from the present invention in that they do not teach to a pressure sensitive computer mouse that includes four quadrangularly-spaced pressure sensors.

FOR EXAMPLE, U.S. Pat. No. 5,184,120 to Schultz teaches a menu selector that includes a force sensitive resistor selector key that is calibrated to a selective range of force for selecting a range of menu items. A variable press by the user is then associated to a selection of a menu item.

ANOTHER EXAMPLE, U.S. Pat. No. 5,217,781 to Kuipers teaches a computer mouse pad that includes a non-static polyvinyl chloride upper layer, a crease-resistant intermediate plastic layer disposed below the non-static polyvinyl chloride upper layer, and a bottom anti-slip layer disposed below the crease-resistant intermediate plastic layer.

STILL ANOTHER EXAMPLE, U.S. Pat. No. 5,260,696 to Maynard, Jr. teaches a computer mouse that includes multi-plane facets on its under side which provide additional signalling depending on which facet of the mouse housing is contacted to the operating desk surface.

YET ANOTHER EXAMPLE, U.S. Pat. No. 5,268,675 to Garthwaite et al. teaches a computer command and pointing device that includes a multi-axis mechanical engagement assembly for insertion into a recess in a computer or keyboard.

FINALLY, STILL YET ANOTHER EXAMPLE, U.S. Pat. No. 5,355,148 to Anderson teaches a finger-point mouse that includes an elastic finger pad with a recess formed therein. The recess is configured to receive a finger. A photo-diode attaches to the underside of the recess and photo-voltaic sensing cells form an array opposite the photo-diode beneath the recess.

It is apparent that numerous innovations for computer devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a pressure sensitive computer mouse that avoids the disadvantages of the prior art.

ANOTHER OBJECT of the present invention is to provide a pressure sensitive computer mouse that is simple and inexpensive to manufacture.

STILL ANOTHER OBJECT of the present invention is to provide a pressure sensitive computer mouse that is simple to use.

YET ANOTHER OBJECT of the present invention is to provide a pressure sensitive computer mouse that provides the user with a very fluid means of interfacing with a computer.

STILL YET ANOTHER OBJECT of the present invention is to provide a pressure sensitive computer mouse whose operation is very close to that of a standard mouse, expect that it requires no movement-or very little movement, as compared to a regular mouse which requires a wide range of motion.

YET STILL ANOTHER OBJECT of the present invention is to provide a pressure sensitive computer mouse wherein as the contact area of the mouse remains relatively stationary with the working surface and as pressure is applied, a slight motion of the actuator is provided that is proportional to the direction and force of the desired movement.

STILL YET ANOTHER OBJECT of the present invention is to provide a pressure sensitive computer mouse wherein a user applies pressure to the mouse in the direction he wishes to move the cursor.

YET STILL ANOTHER OBJECT of the present invention is to provide a pressure sensitive computer mouse wherein the speed of movement of the cursor is dictated by the amount of pressure exerted by the user in the required direction.

STILL YET ANOTHER OBJECT of the present invention is to provide a pressure sensitive computer mouse wherein if the user desires to move the cursor a small distance or slowly, the user simply applies a small pressure in the desired direction.

YET STILL ANOTHER OBJECT of the present invention is to provide a pressure sensitive computer mouse wherein as the need for the movement speed of the cursor by the user is increased, the user simply applies a larger pressure in the desired direction that is proportional to the desired speed.

STILL YET ANOTHER OBJECT of the present invention is to provide a pressure sensitive computer mouse that requires very little room to operate.

YET STILL ANOTHER OBJECT of the present invention is to provide a pressure sensitive computer mouse that operates on most surfaces including a conventional mouse pad.

STILL YET ANOTHER OBJECT of the present invention is to provide a pressure sensitive computer mouse that has no moving parts.

YET STILL ANOTHER OBJECT of the present invention is to provide a pressure sensitive computer mouse that requires no maintenance.

STILL YET ANOTHER OBJECT of the present invention is to provide a pressure sensitive computer mouse that has a longer life span than a conventional mouse.

YET STILL ANOTHER OBJECT of the present invention is to provide a pressure sensitive computer mouse that can move a cursor in the North, South, East, and West direction and in any directions therebetween.

BRIEFLY STATED, STILL YET ANOTHER OBJECT of the present invention is to provide a pressure sensitive computer mouse that includes a hollow computer mouse housing and cursor moving apparatus.

YET STILL ANOTHER OBJECT of the present invention is to provide a pressure sensitive computer mouse wherein the hollow computer mouse housing has a bottom with a circular throughbore and an inner surface.

STILL YET ANOTHER OBJECT of the present invention is to provide a pressure sensitive computer mouse wherein the cursor moving apparatus is responsive to a force of a specific magnitude and of a specific direction that is applied to the hollow housing and moves the computer cursor in the specific direction of which the force is applied to the hollow housing at a specific speed which is directly proportional or at least a function of the specific magnitude of the force being applied to the hollow computer mouse housing without moving the hollow computer mouse housing relative to a surface on which the bottom of the hollow computer mouse housing is in contact therewith.

YET STILL ANOTHER OBJECT of the present invention is to provide a pressure sensitive computer mouse wherein the cursor moving means includes an A/D converter and a 8 bit micro-controller.

STILL YET ANOTHER OBJECT of the present invention is to provide a pressure sensitive computer mouse wherein the cursor moving means further includes a printed circuit board that is disposed in the computer mouse housing and has an upper surface, a circular throughbore, a thickness, and a lower surface.

YET STILL ANOTHER OBJECT of the present invention is to provide a pressure sensitive computer mouse wherein the circular throughbore of the printed circuit board is smaller than and concentric with the circular throughbore of the bottom of the hollow computer mouse housing.

STILL YET ANOTHER OBJECT of the present invention is to provide a pressure sensitive computer mouse wherein the cursor moving means further includes an electrically-conductive quadra-sector land arrangement that is disposed on the lower surface of the printed circuit board and surrounds the circular throughbore of the printed circuit board.

YET STILL ANOTHER OBJECT of the present invention is to provide a pressure sensitive computer mouse wherein the electrically-conductive quadra-sector land arrangement surrounds the circular throughbore of the printed circuit board at a small distance from the circular throughbore of the printed circuit board, so that a non-electrically-conductive ring space is provided between the electrically-conductive quadra-sector land arrangement and the circular throughbore of the printed circuit board.

STILL YET ANOTHER OBJECT of the present invention is to provide a pressure sensitive computer mouse wherein the cursor moving means further includes a deformable actuator that has a stem with a smoothly-outwardly-flaring free distal end, and a proximal end.

YET STILL ANOTHER OBJECT of the present invention is to provide a pressure sensitive computer mouse wherein the deformable actuator further has an generally hemispherically-shaped lower portion with a flat base that has a center point.

STILL YET ANOTHER OBJECT of the present invention is to provide a pressure sensitive computer mouse wherein the cylindrically-shaped stem of the deformable actuator, at the proximal end of the cylindrically-shaped stem of the deformable actuator is integral with and extends normally upwardly from the center point of the flat base of the generally hemispherically-shaped lower portion of the deformable actuator.

YET STILL ANOTHER OBJECT of the present invention is to provide a pressure sensitive computer mouse wherein the generally hemispherically-shaped lower portion of the deformable actuator is disposed below the printed circuit board with the cylindrically-shaped stem of the deformable actuator passing through the circular throughbore of the printed circuit board and with the smoothly-outwardly-flaring free distal end of the cylindrically-shaped stem of the deformable actuator above the upper surface of the printed circuit board, so that the smoothly-outwardly-flaring free distal end of the cylindrically-shaped stem of the deformable actuator prevents unintentional removal of the deformable actuator from the printed circuit board.

STILL YET ANOTHER OBJECT of the present invention is to provide a pressure sensitive computer mouse wherein the cursor moving means further includes a circular resistive disk that has a centrally-disposed aperture.

YET STILL ANOTHER OBJECT of the present invention is to provide a pressure sensitive computer mouse wherein the circular resistive disk is disposed on the flat base of the generally hemispherically-shaped lower portion of the deformable actuator with the cylindrically-shaped stem of the deformable actuator passing freely through the centrally disposed aperture of the circular resistive disk, so that as the force is applied in the specific direction to the hollow computer mouse housing the generally hemispherically-shaped lower portion of the deformable actuator will deform in response thereto and cause a specific part of the circular resistive disk to contact a specific part of the electrically-conductive quadra-sector land arrangement and cause the specific part of the electrically-conductive quadra-sector land arrangement to become electrically conductive and ultimately move the computer cursor in the specific direction, and as the specific magnitude of the force applied to the hollow computer mouse housing is increased the generally hemispherically-shaped lower portion of the deformable actuator deforms greater and causes more of the circular resistive disk to contact the specific area of the electrically-conductive quadra-sector land arrangement and decreases the resistance thereon since more resistance is being applied in parallel across the specific area of the electrically-conductive quadra-sector land arrangement and ultimately moves the computer cursor in the specific direction at a greater specific speed.

STILL YET ANOTHER OBJECT of the present invention is to provide a pressure sensitive computer mouse wherein the circular resistive disk is an insulative disk that has a layer of resistive material disposed on one side thereof.

YET STILL ANOTHER OBJECT of the present invention is to provide a pressure sensitive computer mouse wherein the cursor moving means further includes an insulative washer disposed around the cylindrically-shaped stem of the deformable actuator and sandwiched between the non-electrically-conductive ring space of the lower surface of the printed circuit board and the circular resistive disk.

STILL YET ANOTHER OBJECT of the present invention is to provide a pressure sensitive computer mouse wherein the cursor moving means further includes a deformable actuator that has a cylindrically-shaped stem with a free distal end that has integrally formed thereon an upwardly tapering, circumferencially-disposed, and outwardly extending flange and a proximal end.

YET STILL ANOTHER OBJECT of the present invention is to provide a pressure sensitive computer mouse wherein the deformable actuator further has a concavo-convex-shaped intermediate portion with an upper side that has a center point and an entire perimeter.

STILL YET ANOTHER OBJECT of the present invention is to provide a pressure sensitive computer mouse wherein the cylindrically-shaped stem of the deformable actuator, at the proximal end of the cylindrically-shaped stem of the deformable actuator, is integral with and extends normally upwardly from the center point of the upper surface of the concavo-convex-shaped intermediate portion of the deformable actuator.

YET STILL ANOTHER OBJECT of the present invention is to provide a pressure sensitive computer mouse wherein the concavo-convex-shaped intermediate portion of the deformable actuator is disposed below the printed circuit board with the cylindrically-shaped stem of the deformable actuator passing through the circular throughbore of the printed circuit board and with the upwardly tapering, circumferencially-disposed, and outwardly extending flange of the free distal end of the cylindrically-shaped stem of the deformable actuator resting on the upper surface of the printed circuit board, so that the integrally-formed, upwardly tapering, circumferencially-disposed, and outwardly extending flange of the free distal end of the cylindrically-shaped stem of the deformable actuator prevents unintentional removal of the deformable actuator from the printed circuit board.

STILL YET ANOTHER OBJECT of the present invention is to provide a pressure sensitive computer mouse wherein the deformable actuator further has an upwardly-tapering peripheral ring that is integral with and extends upwardly from the entire perimeter of the upper side of the concavo-convex-shaped intermediate portion of the deformable actuator.

YET STILL ANOTHER OBJECT of the present invention is to provide a pressure sensitive computer mouse wherein the cursor moving means further includes a circular resistive disk that has a centrally-disposed aperture and a thickness.

STILL YET ANOTHER OBJECT of the present invention is to provide a pressure sensitive computer mouse wherein the circular resistive disk is disposed on the upwardly-tapering peripheral ring of the deformable actuator with the cylindrically-shaped stem of the deformable actuator passing freely through the centrally disposed aperture of the circular resistive disk, so that as the force is applied in the specific direction on the hollow computer mouse housing the concavo-convex-shaped intermediate portion of the deformable actuator will ultimately deform in response thereto and cause a specific part of the upwardly-tapering peripheral ring of the deformable actuator to contact a specific part of the circular resistive disk which in turn contacts a specific part of the electrically-conductive quadra-sector land arrangement and cause the specific part of the electrically-conductive quadra-sector land arrangement to become electrically conductive and ultimately move the computer cursor in the specific direction, and as the specific magnitude of the force applied to the hollow computer mouse housing is increased the concavo-convex-shaped intermediate portion of the deformable actuator deforms greater and causes more of the circular resistive disk to contact the specific area of the electrically-conductive quadra-sector land arrangement and decreases the resistance thereon since more resistance is being applied in parallel across the specific area of the electrically-conductive quadra-sector land arrangement and ultimately moves the computer cursor in the specific direction at a greater specific speed.

YET STILL ANOTHER OBJECT of the present invention is to provide a pressure sensitive computer mouse wherein the circular resistive disk is an insulative disk that has a layer of resistive material disposed on one side thereof.

STILL YET ANOTHER OBJECT of the present invention is to provide a pressure sensitive computer mouse wherein the cylindrically-shaped stem of the deformable actuator further has a circumferencially-disposed, and outwardly extending upper intermediate flange that is integrally formed therewith and is disposed below the upwardly tapering, circumferencially-disposed, and outwardly extending flange of the free distal end of the cylindrically-shaped stem of the deformable actuator a distance substantially equal to the thickness of the printed circuit board and above the concavo-convex-shaped intermediate portion of the deformable actuator.

YET STILL ANOTHER OBJECT of the present invention is to provide a pressure sensitive computer mouse wherein the circumferencially-disposed, and outwardly extending upper intermediate flange of the deformable actuator and the upwardly tapering, circumferencially-disposed, and outwardly extending flange of the free distal end of the cylindrically-shaped stem of the deformable actuator define therebetween an upper circumferencial groove.

STILL YET ANOTHER OBJECT of the present invention is to provide a pressure sensitive computer mouse wherein the printed circuit board is securely disposed in the upper circumferencial groove with the non-electrically-conductive ring space of the lower surface of the printed circuit board resting on the circumferencially-disposed, and outwardly extending upper intermediate flange of the deformable actuator.

YET STILL ANOTHER OBJECT of the present invention is to provide a pressure sensitive computer mouse wherein the deformable actuator further has a circumferencially-disposed, and outwardly extending lower intermediate flange that is integrally formed therewith and is disposed below the circumferencially-disposed, and outwardly extending upper intermediate flange of the deformable actuator a distance substantially equal to the thickness of the circular resistive disk and above the concavo-convex-shaped intermediate portion of the deformable actuator.

STILL YET ANOTHER OBJECT of the present invention is to provide a pressure sensitive computer mouse wherein the circumferencially-disposed, and outwardly extending lower intermediate flange of the deformable actuator and the circumferencially-disposed, and outwardly extending upper intermediate flange of the deformable actuator define therebetween an intermediate circumferencial groove in which the circular resistive disk is securely disposed with the upwardly-tapering peripheral ring of the deformable actuator in contact therewith.

YET STILL ANOTHER OBJECT of the present invention is to provide a pressure sensitive computer mouse wherein the deformable actuator further has a circumferencially-disposed, and outwardly extending lower flange that is integrally formed therewith and is disposed below the concavo-convex-shaped intermediate portion of the deformable actuator and above the bottom of the hollow computer mouse housing.

STILL YET ANOTHER OBJECT of the present invention is to provide a pressure sensitive computer mouse wherein the deformable actuator further has a circular-shaped lower portion that is integrally formed therewith and has an upper surface and resiliency.

YET STILL ANOTHER OBJECT of the present invention is to provide a pressure sensitive computer mouse wherein the circular-shaped lower portion of the deformable actuator is disposed below the circumferencially-disposed, and outwardly extending lower flange of the deformable actuator and sits movably in the circular throughbore of the bottom of the hollow computer mouse housing.

STILL YET ANOTHER OBJECT of the present invention is to provide a pressure sensitive computer mouse wherein the upper surface of the circular-shaped lower portion of the deformable actuator has a plurality of dimples disposed thereon for increasing the resiliency of the circular-shaped lower portion of the deformable actuator.

YET STILL ANOTHER OBJECT of the present invention is to provide a pressure sensitive computer mouse wherein the circular-shaped lower portion of the deformable actuator and the circumferencially-disposed, and outwardly extending lower flange of the deformable actuator define therebetween a lower circumferencial groove.

STILL YET ANOTHER OBJECT of the present invention is to provide a pressure sensitive computer mouse wherein the deformable actuator further has a circular closure disk with a centrally-disposed throughbore.

YET STILL ANOTHER OBJECT of the present invention is to provide a pressure sensitive computer mouse wherein the circular closure disk of the deformable actuator is securely disposed in the lower circumferencial groove of the deformable actuator.

STILL YET ANOTHER OBJECT of the present invention is to provide a pressure sensitive computer mouse wherein the circular closure disk of the deformable actuator is wider than the circular throughbore of the bottom of the computer mouse housing and rests on the inner surface of the bottom of the hollow computer mouse housing.

YET STILL ANOTHER OBJECT of the present invention is to provide a pressure sensitive computer mouse wherein the electrically-conductive quadra-sector land arrangement includes a plurality of North quadrant electrically-conductive concentric arcs that are in electrical communication with each other and ultimately with the A/D converter.

STILL YET ANOTHER OBJECT of the present invention is to provide a pressure sensitive electricalluse wherein the electrically-conductive quadra-sector land arrangement further includes a plurality of South quadrant electrically-conductive concentric arcs that are in electrical communication with each other and ultimately with the A/D converter.

YET STILL ANOTHER OBJECT of the present invention is to provide a pressure sensitive computer mouse wherein the plurality of South quadrant electrically-conductive concentric arcs are disposed opposite to the plurality of North quadrant electrically-conductive concentric arcs and are not in electrical communication therewith.

STILL YET ANOTHER OBJECT of the present invention is to provide a pressure sensitive computer mouse wherein the electrically-conductive quadra-sector land arrangement further includes a plurality of East quadrant electrically-conductive concentric arcs that are in electrical communication with each other and ultimately with the A/D converter.

YET STILL ANOTHER OBJECT of the present invention is to provide a pressure sensitive computer mouse wherein the plurality of East quadrant electrically-conductive concentric arcs are disposed intermediate to the plurality of North quadrant electrically-conductive concentric arcs and the plurality of South quadrant electrically-conductive concentric arcs and are not in electrical communication therewith.

STILL YET ANOTHER OBJECT of the present invention is to provide a pressure sensitive computer mouse wherein the electrically-conductive quadra-sector land arrangement further includes a plurality of West quadrant electrically-conductive concentric arcs that are in electrical communication with each other and ultimately with the A/D converter.

YET STILL ANOTHER OBJECT of the present invention is to provide a pressure sensitive computer mouse wherein the plurality of West quadrant electrically-conductive concentric arcs are disposed intermediate to the plurality of North quadrant electrically-conductive concentric arcs and the plurality of South quadrant electrically-conductive concentric arcs and are not in electrical communication therewith, and opposite to the plurality of East quadrant electrically-conductive concentric arcs and are not in electrical communication therewith.

STILL YET ANOTHER OBJECT of the present invention is to provide a pressure sensitive computer mouse wherein the electrically-conductive quadra-sector land arrangement further includes a plurality of North East quadrant electrically-conductive concentric arcs that are in electrical communication with each other and with a power source.

YET STILL ANOTHER OBJECT of the present invention is to provide a pressure sensitive computer mouse wherein each of the plurality of North East quadrant electrically-conductive concentric arcs is disposed intermediate and concentric to, and not in electrical communication with, a pair of the plurality of North quadrant electrically-conductive concentric arcs and a pair of the plurality of East quadrant electrically-conductive concentric arcs.

STILL YET ANOTHER OBJECT of the present invention is to provide a pressure sensitive computer mouse wherein the electrically-conductive quadra-sector land arrangement further includes a plurality of South East quadrant electrically-conductive concentric arcs that are in electrical communication with each other and with the plurality of North East quadrant electrically-conductive concentric arcs.

YET STILL ANOTHER OBJECT of the present invention is to provide a pressure sensitive computer mouse wherein each of the plurality of South East quadrant electrically-conductive concentric arcs is disposed intermediate and concentric to, and not in electrical communication with, a pair of the plurality of East quadrant electrically-conductive concentric arcs and a pair of the plurality of South quadrant electrically-conductive concentric arcs.

STILL YET ANOTHER OBJECT of the present invention is to provide a pressure sensitive computer mouse wherein the electrically-conductive quadra-sector land arrangement further includes a plurality of South West quadrant electrically-conductive concentric arcs that are in electrical communication with each other and with the plurality of South East quadrant electrically-conductive concentric arcs.

YET STILL ANOTHER OBJECT of the present invention is to provide a pressure sensitive computer mouse wherein each of the plurality of South West quadrant electrically-conductive concentric arcs is disposed intermediate and concentric to, and not in electrical communication with, a pair of the plurality of West quadrant electrically-conductive concentric arcs and a pair of the plurality of South quadrant electrically-conductive concentric arcs.

STILL YET ANOTHER OBJECT of the present invention is to provide a pressure sensitive computer mouse wherein the electrically-conductive quadra-sector land arrangement further includes a plurality of North West quadrant electrically-conductive concentric arcs that are in electrical communication with each other and with the plurality of South West quadrant electrically-conductive concentric arcs.

YET STILL ANOTHER OBJECT of the present invention is to provide a pressure sensitive computer mouse wherein each of the plurality of North West quadrant electrically-conductive concentric arcs is disposed intermediate and concentric to, and not in electrical communication with, a pair of the plurality of West quadrant electrically-conductive concentric arcs and a pair of the plurality of North quadrant electrically-conductive concentric arcs.

STILL YET ANOTHER OBJECT of the present invention is to provide a pressure sensitive computer mouse wherein the electrically-conductive quadra-sector land arrangement includes a first plurality of North quadrant electrically-conductive, skew, parallel, and straight lines that are in electrical communication with each other and ultimately with the A/D converter.

YET STILL ANOTHER OBJECT of the present invention is to provide a pressure sensitive computer mouse wherein the electrically-conductive quadra-sector land arrangement further includes a first plurality of South quadrant electrically-conductive, skew, parallel, and straight lines that are in electrical communication with each other and ultimately with the A/D converter.

STILL YET ANOTHER OBJECT of the present invention is to provide a pressure sensitive computer mouse wherein the first plurality of South quadrant electrically-conductive, skew, parallel, and straight lines are disposed opposite and oriented parallel to, and are not in electrical communication with, the first plurality of North quadrant electrically-conductive, skew, parallel, and straight lines.

YET STILL ANOTHER OBJECT of the present invention is to provide a pressure sensitive computer mouse wherein the electrically-conductive quadra-sector land arrangement further includes a first plurality of East quadrant electrically-conductive, skew, parallel, and straight lines that are in electrical communication with each other and ultimately with the A/D converter.

STILL YET ANOTHER OBJECT of the present invention is to provide a pressure sensitive computer mouse wherein the first plurality of East quadrant electrically-conductive, skew, parallel, and straight lines are disposed intermediate and oriented perpendicular to, and are not in electrical communication with, the first plurality of North quadrant electrically-conductive, skew, parallel, and straight lines and the first plurality of South quadrant electrically-conductive, skew, parallel, and straight lines.

YET STILL ANOTHER OBJECT of the present invention is to provide a pressure sensitive computer mouse wherein the electrically-conductive quadra-sector land arrangement further includes a first plurality of West quadrant electrically-conductive, skew, parallel, and straight lines that are in electrical communication with each other and ultimately with the A/D converter.

STILL YET ANOTHER OBJECT of the present invention is to provide a pressure sensitive computer mouse wherein the first plurality of West quadrant electrically-conductive, skew, parallel, and straight lines are disposed intermediate and oriented perpendicular to, and are not in electrical communication with, the first plurality of North quadrant electrically-conductive, skew, parallel, and straight lines and the first plurality of South quadrant electrically-conductive, skew, parallel, and straight lines.

YET STILL ANOTHER OBJECT of the present invention is to provide a pressure sensitive computer mouse wherein the first plurality of West quadrant electrically-conductive, skew, parallel, and straight lines are disposed opposite to, and are not in electrical communication with the first plurality of East quadrant electrically-conductive, skew, parallel, and straight lines.

STILL YET ANOTHER OBJECT of the present invention is to provide a pressure sensitive computer mouse wherein the electrically-conductive quadra-sector land arrangement further includes a second plurality of North quadrant electrically-conductive, skew, parallel, and straight lines that are in electrical communication with each other and with a power source.

YET STILL ANOTHER OBJECT of the present invention is to provide a pressure sensitive computer mouse wherein each of the second plurality of North quadrant electrically-conductive, skew, and parallel lines is disposed intermediate and parallel to, and is not in electrical communication with, the first plurality of North quadrant electrically-conductive, skew, parallel, and straight lines.

STILL YET ANOTHER OBJECT of the present invention is to provide a pressure sensitive computer mouse wherein the electrically-conductive quadra-sector land arrangement further includes a second plurality of East quadrant electrically-conductive, skew, and parallel lines that are in electrical communication with each other and with the second plurality of North quadrant electrically-conductive, skew, and parallel lines.

YET STILL ANOTHER OBJECT of the present invention is to provide a pressure sensitive computer mouse wherein each of the second plurality of East quadrant electrically-conductive, skew, and parallel lines is disposed intermediate and parallel to, and is not in electrical communication with, the first plurality of East quadrant electrically-conductive, skew, parallel, and straight lines.

STILL YET ANOTHER OBJECT of the present invention is to provide a pressure sensitive computer mouse wherein the electrically-conductive quadra-sector land arrangement further includes a second plurality of South quadrant electrically-conductive, skew, and parallel lines that are in electrical communication with each other and with the second plurality of East quadrant electrically-conductive, skew, and parallel lines.

YET STILL ANOTHER OBJECT of the present invention is to provide a pressure sensitive computer mouse wherein each of the second plurality of South quadrant electrically-conductive, skew, and parallel lines is disposed intermediate and parallel to, and is not in electrical communication with, the first plurality of South quadrant electrically-conductive, skew, parallel, and straight lines.

STILL YET ANOTHER OBJECT of the present invention is to provide a pressure sensitive computer mouse wherein the electrically-conductive quadra-sector land arrangement further includes a second plurality of West quadrant electrically-conductive, skew, and parallel lines that are in electrical communication with each other and with the second plurality of South quadrant electrically-conductive, skew, and parallel lines.

YET STILL ANOTHER OBJECT of the present invention is to provide a pressure sensitive computer mouse wherein each of the second plurality of West quadrant electrically-conductive, skew, and parallel lines is disposed intermediate and parallel to, and is not in electrical communication with, the first plurality of West quadrant electrically-conductive, skew, parallel, and straight lines.

STILL YET ANOTHER OBJECT of the present invention is to provide a pressure sensitive computer mouse wherein the electrically-conductive quadra-sector land arrangement includes a first plurality of North quadrant electrically-conductive, parallel, and straight lines that are in electrical communication with each other via a first North quadrant electrically-conductive and semi-circular-shaped arc which in turn is in electrical communication ultimately with the A/D converter.

YET STILL ANOTHER OBJECT of the present invention is to provide a pressure sensitive computer mouse wherein the electrically-conductive quadra-sector land arrangement further includes a first plurality of South quadrant electrically-conductive, parallel, and straight lines that are in electrical communication with each other via a first South quadrant electrically-conductive and semi-circular-shaped arc which in turn is in electrical communication ultimately with the A/D converter.

STILL YET ANOTHER OBJECT of the present invention is to provide a pressure sensitive computer mouse wherein the first plurality of South quadrant electrically-conductive, parallel, and straight lines are disposed in opposition to the first plurality of North quadrant electrically-conductive, parallel, and straight lines and are not in electrical communication therewith.

YET STILL ANOTHER OBJECT of the present invention is to provide a pressure sensitive computer mouse wherein the electrically-conductive quadra-sector land arrangement further includes a first plurality of East quadrant electrically-conductive, parallel, and straight lines that are in electrical communication with each other via a first East quadrant electrically-conductive and semi-circular-shaped arc which in is in electrical communication ultimately with the A/D converter.

STILL YET ANOTHER OBJECT of the present invention is to provide a pressure sensitive computer mouse wherein the first plurality of East quadrant electrically-conductive, parallel, and straight lines are disposed intermediate to, and are not in electrical communication with, the first plurality of North quadrant electrically-conductive, parallel, and straight lines and the first plurality of South quadrant electrically-conductive, parallel, and straight lines.

YET STILL ANOTHER OBJECT of the present invention is to provide a pressure sensitive computer mouse wherein the electrically-conductive quadra-sector land arrangement further includes a first plurality of West quadrant electrically-conductive, parallel, and straight lines that are in electrical communication with each other via a first West quadrant electrically-conductive and semi-circular-shaped arc which in turn is in electrical communication ultimately with the A/D converter.

STILL YET ANOTHER OBJECT of the present invention is to provide a pressure sensitive computer mouse wherein the first plurality of West quadrant electrically-conductive, parallel, and straight lines are disposed intermediate to, and are not in electrical communication with, the first plurality of North quadrant electrically-conductive, parallel, and straight lines and the first plurality of South quadrant electrically-conductive, parallel, and straight lines.

YET STILL ANOTHER OBJECT of the present invention is to provide a pressure sensitive computer mouse wherein the first plurality of West quadrant electrically-conductive, parallel, and straight lines are disposed in opposition to, and are not in electrical communication with, first plurality of East quadrant electrically-conductive, parallel, and straight lines.

STILL YET ANOTHER OBJECT of the present invention is to provide a pressure sensitive computer mouse wherein the electrically-conductive quadra-sector land arrangement further includes a second plurality of North quadrant electrically-conductive, parallel, and straight lines that are in electrical communication with each other via a second North quadrant electrically-conductive and semi-circular-shaped arc that is in electrical communication with a power source.

YET STILL ANOTHER OBJECT of the present invention is to provide a pressure sensitive computer mouse wherein each of the second plurality of North quadrant electrically-conductive, parallel, and straight lines is disposed intermediate and parallel to, and is not in electrical communication with, the first plurality of North quadrant electrically-conductive, parallel, and straight lines.

STILL YET ANOTHER OBJECT of the present invention is to provide a pressure sensitive computer mouse wherein the electrically-conductive quadra-sector land arrangement further includes a second plurality of East quadrant electrically-conductive, parallel, and straight lines that are in electrical communication with each other via an East quadrant electrically-conductive and semi-circular-shaped arc that is in electrical communication with the second plurality of North quadrant electrically-conductive, parallel, and straight lines.

YET STILL ANOTHER OBJECT of the present invention is to provide a pressure sensitive computer mouse wherein each of the second plurality of East quadrant electrically-conductive, parallel, and straight lines is disposed intermediate and parallel to, and is not in electrical communication with, the first plurality of East quadrant electrically-conductive, parallel, and straight lines.

STILL YET ANOTHER OBJECT of the present invention is to provide a pressure sensitive computer mouse wherein the electrically-conductive quadra-sector land arrangement further includes a second plurality of South quadrant electrically-conductive, parallel, and straight lines that are in electrical communication with each other via a South quadrant electrically-conductive and semi-circular-shaped arc that is in electrical communication with the second plurality of East quadrant electrically-conductive, parallel, and straight lines.

YET STILL ANOTHER OBJECT of the present invention is to provide a pressure sensitive computer mouse wherein each of the second plurality of South quadrant electrically-conductive, parallel, and straight lines is disposed intermediate and parallel to, and is not in electrical communication with, the first plurality of South quadrant electrically-conductive, parallel, and straight lines.

STILL YET ANOTHER OBJECT of the present invention is to provide a pressure sensitive computer mouse wherein the electrically-conductive quadra-sector land arrangement further includes a second plurality of West quadrant electrically-conductive, parallel, and straight lines that are in electrical communication with each other via a West quadrant electrically-conductive and semi-circular-shaped arc that is in electrical communication with the second plurality of South quadrant electrically-conductive, parallel, and straight lines and the second plurality of North quadrant electrically-conductive, parallel, and straight lines.

FINALLY, YET STILL ANOTHER OBJECT of the present invention is to provide a pressure sensitive computer mouse wherein each of the second plurality of West quadrant electrically-conductive, parallel, and straight lines is disposed intermediate and parallel to, and is not in electrical communication with, the first plurality of West quadrant electrically-conductive, parallel, and straight lines.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention;

FIG. 2 is a schematic block diagram of the present invention utilizing a generalized strain transducer scheme for illustrating the general operation of the present invention;

FIG. 4 is a cross sectional view with parts broken away and taken on line 4—4 in FIG. 1 utilizing an embodiment of the actuator of the present invention;

Figure 3:
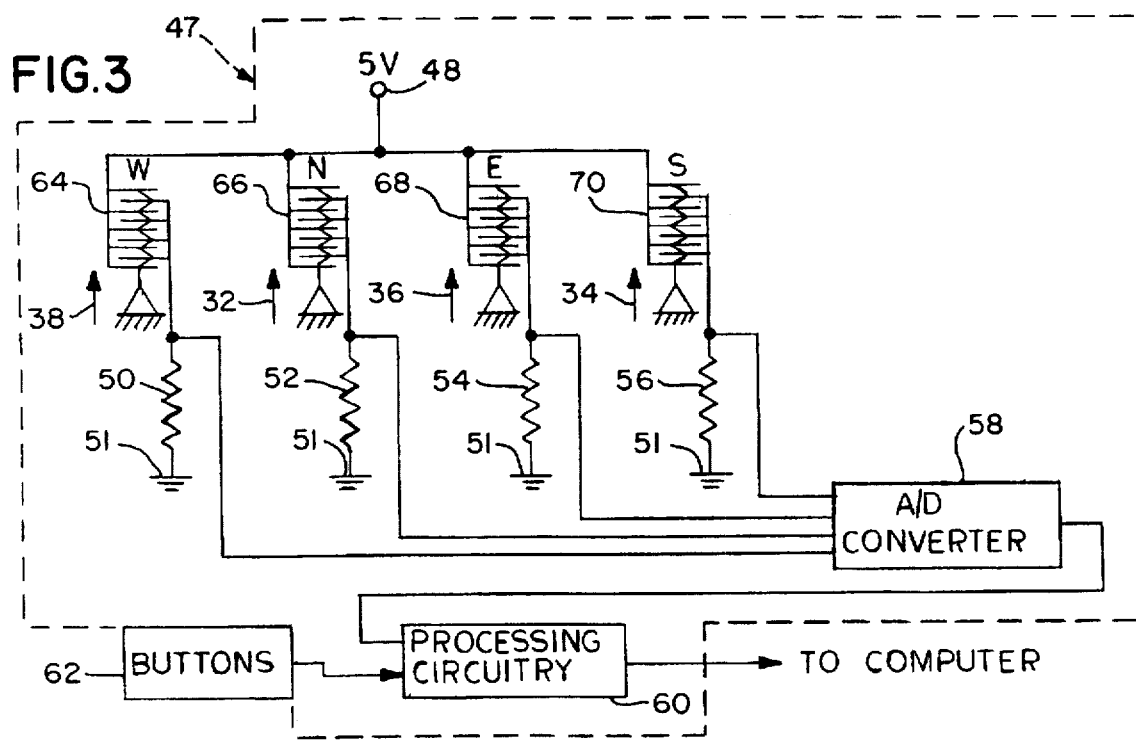
FIG. 3 is a schematic block diagram of the present invention utilizing a generalized force sensing resistor scheme for illustrating the general operation of the present invention.

LIST OF REFERENCE NUMERALS UTILIZED IN THE DRAWING 10 pressure sensitive computer mouse of the present invention
12 work surface
14 mouse movement area
18 computer
20 computer mouse cord
22 computer cursor
24 computer cursor North direction
26 computer cursor South direction
28 computer cursor East direction
30 computer cursor West direction
32 computer cursor North direction pressure arrow
34 computer cursor South direction pressure arrow
36 computer cursor East direction pressure arrow
38 computer cursor West direction pressure arrow
40 West direction strain gauge transducer
42 North direction strain gauge transducer
44 East direction strain gauge transducer
46 South direction strain gauge transducer
47 computer mouse housing
48 5 volt power source
50 West direction resistor
51 ground
52 North direction resistor
54 East direction resistor
56 South direction resistor
58 A/D converter
60 programmable 8 bit micro-controller
62 computer mouse buttons
64 West direction force sensing resistor
66 North direction force sensing resistor
68 East direction force sensing resistor
70 South direction force sensing resistor
72 printed circuit board
73 printed circuit board upper surface
74 printed circuit board circular throughbore
75 printed circuit board lower surface
76 computer mouse housing bottom
78 computer mouse housing bottom circular throughbore
80 electrically-conductive quadra-sector land arrangement
81 printed circuit board lower surface non-electrically-conductive ring space
82 deformable actuator
84 deformable actuator stem
86 actuator stem smoothly-outwardly-flaring free distal end
88 actuator stem proximal end
90 deformable actuator generally hemispherically-shaped lower portion
92 actuator lower portion flat base
94 actuator lower portion flat base center point
96 circular resistive disk
98 circular resistive disk centrally-disposed aperture
100 insulative washer
182 deformable actuator
184 deformable actuator cylindrically-shaped stem
186 actuator stem free distal end
187 actuator stem free distal end integrally-formed, upwardly tapering, circumferencially-disposed, and outwardly extending flange
188 actuator stem proximal end
190 deformable actuator concavo-convex-shaped intermediate portion
192 actuator lower portion concave-shaped upper side
194 actuator lower portion upper side center point
195 deformable actuator upwardly-tapering peripheral ring
198 deformable actuator integrally-formed, circumferencially-disposed, and outwardly extending upper intermediate flange
200 actuator upper circumferencial groove
202 deformable actuator integrally-formed, circumferencially-disposed, and outwardly extending lower intermediate flange
204 actuator intermediate circumferencial groove
206 deformable actuator integrally-formed, circumferencially-disposed, and outwardly extending lower flange
208 deformable actuator integrally-formed, circular-shaped lower portion
210 actuator lower portion upper surface
211 plurality of actuator lower portion upper surface dimples
212 actuator lower circumferencial groove 214 circular closure disk 214
216 closure disk centrally-disposed throughbore
218 plurality of North quadrant electrically-conductive concentric arcs
222 plurality of South quadrant electrically-conductive concentric arcs
226 plurality of East quadrant electrically-conductive concentric arcs
230 plurality of West quadrant electrically-conductive concentric arcs
234 plurality of North East quadrant electrically-conductive concentric arcs
236 plurality of South East quadrant electrically-conductive concentric arcs
238 plurality of South West quadrant electrically-conductive concentric arcs
240 plurality of North West quadrant electrically-conductive concentric arcs
242 first plurality of North quadrant electrically-conductive, skew, parallel, and straight lines
244 first plurality of South quadrant electrically-conductive, skew, parallel, and straight lines
246 first plurality of East quadrant electrically-conductive, skew, parallel, and straight lines
248 first plurality of West quadrant electrically-conductive, skew, parallel, and straight lines
250 second plurality of North quadrant electrically-conductive, skew, parallel, and straight lines
252 second plurality of East quadrant electrically-conductive, skew, and parallel lines
254 second plurality of South quadrant electrically-conductive, skew, and parallel lines
256 second plurality of West quadrant electrically-conductive, skew, and parallel lines
258 first plurality of North quadrant electrically-conductive, parallel, and straight lines
260 first North quadrant electrically-conductive and semi-circular-shaped arc
262 first plurality of South quadrant electrically-conductive, parallel, and straight lines
264 first South quadrant electrically-conductive and semi-circular-shaped arc
266 first plurality of East quadrant electrically-conductive, parallel, and straight lines
268 first East quadrant electrically-conductive and semi-circular-shaped arc
270 first plurality of West quadrant electrically-conductive, parallel, and straight lines
272 first West quadrant electrically-conductive and semi-circular-shaped arc
274 second plurality of North quadrant electrically-conductive, parallel, and straight lines
276 second North quadrant electrically-conductive and semi-circular-shaped arc
278 second plurality of East quadrant electrically-conductive, parallel, and straight lines
280 East quadrant electrically-conductive and semi-circular-shaped arc
282 second plurality of South quadrant electrically-conductive, parallel, and straight lines
284 South quadrant electrically-conductive and semi-circular-shaped arc
286 second plurality of West quadrant electrically-conductive, parallel, and straight lines
288 West quadrant electrically-conductive and semi-circular-shaped arc

DETAILED DESCRIPTION OF THE PREFERRED EMBODIMENT

Referring now to the figures in which like numerals indicate like parts, and particularly to FIG. 1, the pressure sensitive computer mouse of the present invention is shown generally at 10 resting substantially stationary on a work surface 12 and having a minimal lateral and longitudinal range of motion identified by a negligible mouse movement area 14.

The pressure sensitive computer mouse 10 is interfaced to a computer 18 by a computer mouse cord 20. The computer 18 has a computer cursor 22 movable in a computer cursor North direction 24, a computer cursor South direction 26, a computer cursor East direction 28, a computer cursor West direction 30, and any computer cursor directions therebetween.

To move the computer cursor 22 in the computer cursor North direction 24, a force is applied to the pressure sensitive computer mouse 10 in the direction of a computer cursor North direction pressure arrow 32. The speed at which the computer cursor 22 moves in the computer cursor North direction 24 is directly proportional to, or at least a function of, the amount of force that is exerted on the pressure sensitive computer mouse 10 in the direction of the computer cursor North direction pressure arrow 32.

To move the computer cursor 22 in the computer cursor South direction 26, a force is applied to the pressure sensitive computer mouse 10 in the direction of a computer cursor South direction pressure arrow 34. The speed at which the computer cursor 22 moves in the computer cursor South direction 26 is directly proportional to, or at least a function of, the amount of force that is exerted on the pressure sensitive computer mouse 10 in the direction of the computer cursor South direction pressure arrow 34.

To move the computer cursor 22 in the computer cursor East direction 28, a force is applied to the pressure sensitive computer mouse 10 in the direction of a computer cursor East direction pressure arrow 36. The speed at which the computer cursor 22 moves in the computer cursor East direction 28 is directly proportional to, or at least a function of, the amount of force that is applied to the pressure sensitive computer mouse 10 in the direction of the computer cursor East direction pressure arrow 36.

To move the computer cursor 22 in the computer cursor West direction 30, a force is applied to the pressure sensitive computer mouse 10 in the direction of a computer cursor West direction pressure arrow 38. The speed at which the computer cursor 22 moves in the computer cursor West direction 30 is directly proportional to, or at least a function of, the amount of force that is applied to the pressure sensitive computer mouse 10 in the direction of the computer cursor West direction pressure arrow 38.

It is to be understood, however, that the use of the computer cursor North direction 24 and the respective computer cursor North direction pressure arrow 32, the computer cursor South direction 26 and the respective computer cursor South direction pressure arrow 34, the computer cursor East direction 28 and the respective computer cursor East direction pressure arrow 36, and the computer cursor West direction 30 and the respective computer cursor West direction arrow 38, are for illustrative purposes only, and that the computer cursor 22 may be moved in any direction intermediate the computer cursor North direction 24, the computer cursor South direction 26, the computer cursor East direction 28, and the computer cursor West direction 30 by simply applying a force to the pressure sensitive computer mouse 10 in a direction intermediate the computer cursor North direction pressure arrow 32, the computer cursor South direction pressure arrow 34, the computer cursor East direction pressure arrow 36, and the computer cursor West direction pressure arrow 38.

The configuration of an embodiment of the pressure sensitive computer mouse 10 utilizing strain gauge transducers can best be seen in FIG. 2, and as such, will be discussed with reference thereto.

The pressure sensitive computer mouse 10 includes a West direction strain gauge transducer 40, a North direction strain gauge transducer 42, an East direction strain gauge transducer 44, and a South direction strain gauge transducer 46 that are disposed in a computer mouse housing 47 and are connected to a 5 volt power source 48.

The pressure sensitive computer mouse 10 further includes a West direction resistor 50 that is connected across the West direction strain gauge transducer 40 and ground 51 and functions as a West direction voltage divider.

The pressure sensitive computer mouse 10 further includes a North direction resistor 52 that is connected across the North direction strain gauge transducer 42 and ground 51 and functions as a North direction voltage divider.

The pressure sensitive computer mouse 10 further includes an East direction resistor 54 that is connected across the East direction strain gauge transducer 44 and ground 51 and functions as an East direction voltage divider.

The pressure sensitive computer mouse 10 further includes a South direction resistor 56 that is connected across the South direction strain gauge transducer 46 and ground 51 and functions as a South direction voltage divider.

The West direction strain gauge transducer 40, the North direction strain gauge transducer 42, the East direction strain gauge transducer 44, and the South direction strain gauge transducer 46 are in electrical communication ultimately with an A/D converter 58 for converting the analog outputs of the West direction strain gauge transducer 40, the North direction strain gauge transducer 42, the East direction strain gauge transducer 44, and the South direction strain gauge transducer 46 to digital outputs.

The sensor outputs generated by the movement of the pressure sensitive computer mouse 10 are fed to the A/D converter 58 whose output is feed to a programmable 8 bit micro-controller 60, which after conditioning, supplies the necessary outputs to the computer 18 to move the computer cursor 22 in the proper direction. The programmable 8 bit micro-controller 60 is of the type sold by, but not limited to, MICROCHIP under part #PIC16C71XTP.

Computer mouse buttons 62, that are disposed on the computer mouse housing 47, are connected to the programmable 8 bit micro-controller 60 and function in the conventional manner.

When a force is applied to the pressure sensitive computer mouse 10 in the direction of the computer cursor West direction pressure arrow 38, the West direction strain gauge transducer 40 will respond accordingly and generate an output that will ultimately move the computer cursor 22 in the computer cursor West direction 30 at a speed directly proportional to, or at least a function of, the force exerted on the pressure sensitive computer mouse 10 in the direction of the computer cursor West direction pressure arrow 38.

When a force is applied to the pressure sensitive computer mouse 10 in the direction of the computer cursor North direction pressure arrow 32, the North direction strain gauge transducer 42 will respond accordingly and generate an output that will ultimately move the computer cursor 22 in the computer cursor North direction 24 at a speed directly proportional to, or at least a function of, the force exerted on the pressure sensitive computer mouse 10 in the direction of the computer cursor North direction pressure arrow 32.

When a force is applied to the pressure sensitive computer mouse 10 in the direction of computer cursor East direction pressure arrow 36, the East direction strain gauge transducer 44 will respond accordingly and generate an output that will ultimately move the computer cursor 22 in the computer cursor East direction 28 at a speed directly proportional to, or at least a function of, the force exerted on the pressure sensitive computer mouse 10 in the direction of the computer cursor East direction pressure arrow 36.

When a force is applied to the pressure sensitive computer mouse 10 in the direction of cursor South direction pressure arrow 34, the South direction strain gauge transducer 46 will respond accordingly and generate an output that will ultimately move the computer cursor 22 in the computer cursor South direction 26 at a speed directly proportional to, or at least a function of, the force exerted on the pressure sensitive computer mouse 10 in the direction of the computer cursor South direction pressure arrow 34.

The configuration of another embodiment of the pressure sensitive computer mouse 10 utilizing force sensitive resistors can best be seen in FIG. 3, and as such, will be discussed with reference thereto.

The force sensitive resistors are of the type sold by, but not limited to, INTERLINK ELECTRONICS of 1110 Mark Avenue Carpinteria, Calif.

The pressure sensitive computer mouse 10 includes a West direction force sensing resistor 64, a North direction force sensing resistor 66, an East direction force sensing resistor 68, and a South direction force sensing resistor 70 that are disposed in the computer mouse housing 47 and are connected to the 5 volt power source 48.

The pressure sensitive computer mouse 10 further includes the West direction resistor 50 that is connected across the West direction force sensing resistor 64 and ground 51 and functions as the West direction voltage divider.

The pressure sensitive computer mouse 10 further includes the North direction resistor 52 that is connected across the North direction force sensing resistor 66 and ground 51 and functions as the North direction voltage divider.

The pressure sensitive computer mouse 10 further includes the East direction resistor 54 that is connected across the East direction force sensing resistor 68 and ground 51 functions as the East direction voltage divider.

The pressure sensitive computer mouse 10 further includes the South direction resistor 56 that is connected across the South direction force sensing resistor 70 and ground 51 and functions as the South direction voltage divider.

The West direction force sensing resistor 64, the North direction force sensing resistor 66, the East direction force sensing resistor 68, and the South direction force sensing resistor 70 are in electrical communication ultimately with the A/D converter 58 for converting the analog outputs of the West direction force sensing resistor 64, the North direction force sensing resistor 66, the East direction force sensing resistor 68, and the South direction force sensing resistor 70 to digital outputs.

The sensor outputs generated by the movement of the pressure sensitive computer mouse 10 are fed to the A/D converter 58 whose output is feed to the programmable 8 bit micro-controller 60, which after conditioning, supplies the necessary outputs to the computer 18 to move the computer cursor 22 in the proper direction. The programmable 8 bit micro-controller 60 is of the type sold by, but not limited to, MICROCHIP under part #PIC16C71XTP.

The Computer mouse buttons 62, that are disposed on the computer mouse housing 47, are connected to the programmable 8 bit micro-controller 60 and function in the conventional manner.

When a force is applied to the pressure sensitive computer mouse 10 in the direction of the computer cursor West direction pressure arrow 38, the West direction force sensing resistor 64 will respond accordingly and generate an output that will ultimately move the computer cursor 22 in the computer cursor West direction 30 at a speed directly proportional to, or at least a function of, the force exerted on the pressure sensitive computer mouse 10 in the direction of the computer cursor West direction pressure arrow 38.

When a force is applied to the pressure sensitive computer mouse 10 in the direction of the computer cursor North direction pressure arrow 32, the North direction force sensing resistor 66 will respond accordingly and generate an output that will ultimately move the computer cursor 22 in the computer cursor North direction 24 at a speed directly proportional to, or at least a function of, the force exerted on the pressure sensitive computer mouse 10 in the direction of the computer cursor North direction pressure arrow 32.

When a force is applied to the pressure sensitive computer mouse 10 in the direction of the computer cursor East direction pressure arrow 36, the East direction force sensing resistor 68 will respond accordingly and generate an output that will ultimately move the computer cursor 22 in the computer cursor East direction 28 at a speed directly proportional to, or at least a function of, the force exerted on the pressure sensitive computer mouse 10 in the direction of the computer cursor East direction pressure arrow 36.

When a force is applied to the pressure sensitive computer mouse 10 in the direction of the computer cursor South direction pressure arrow 34, the South direction force sensing resistor 70 will respond accordingly and generate an output that will ultimately move the computer cursor 22 in the computer cursor South direction 26 at a speed directly proportional to, or at least a function of, the force 19 exerted on the pressure sensitive computer mouse 10 in the direction of the computer cursor South direction pressure arrow 34.

The configuration of another embodiment of the pressure sensitive computer mouse 10 utilizing a novel arrangement in place of the four strain gauge transducers of the first embodiment and the four force sensitive resistors of the second embodiment can best be seen in FIG. 4, and as such, will be discussed with reference thereto.

The pressure sensitive computer mouse 10 includes a printed circuit board 72 that is disposed in the computer mouse housing 47 and has a printed circuit board upper surface 73, a printed circuit board circular throughbore 74, and a printed circuit board lower surface 75.

The computer mouse housing 47 has a computer mouse housing bottom 76 with a computer mouse housing bottom circular throughbore 78 that is larger than, and is concentric with, the printed circuit board circular throughbore 74 of the printed circuit board 72.

The pressure sensitive computer mouse 10 further includes an electrically-conductive quadra-sector land arrangement 80 that is disposed on the printed circuit board lower surface 75 of the printed circuit board 72 and surrounds the printed circuit board circular throughbore 74 of the printed circuit board 72.

The electrically-conductive quadra-sector land arrangement 80 surrounds the printed circuit board circular throughbore 74 of the printed circuit board 72 at a small distance from the printed circuit board circular throughbore 74 of the printed circuit board 72, so that a printed circuit board lower surface non-electrically-conductive ring space 81 is provided between the electrically-conductive quadra-sector land arrangement 80 and the printed circuit board circular throughbore 74 of the printed circuit board 72.

The pressure sensitive computer mouse 10 further includes a deformable actuator 82 that has a deformable actuator stem 84 with an actuator stem smoothly-outwardly-flaring free distal end 86 and an actuator stem proximal end 88.

The deformable actuator 82 further has a deformable actuator generally hemispherically-shaped lower portion 90 with an actuator lower portion flat base 92 that has an actuator lower portion flat base center point 94.

The deformable actuator cylindrically-shaped stem 84 of the deformable actuator 82, at the actuator stem proximal end 88 of the deformable actuator cylindrically-shaped stem 84 of the deformable actuator 82, extends normally upwardly from and integral with the actuator lower portion flat base center point 94 of the actuator lower portion flat base 92 of the deformable actuator generally hemispherically-shaped lower portion 90 of the deformable actuator 82.

The deformable actuator generally hemispherically-shaped lower portion 90 of the deformable actuator 82 is disposed below the printed circuit board 72 with the deformable actuator cylindrically-shaped stem 84 of the deformable actuator 82 passing through the printed circuit board circular throughbore 74 of the printed circuit board 72 and with the actuator stem smoothly-outwardly-flaring free distal end 86 of the deformable actuator cylindrically-shaped stem 84 of the deformable actuator 82 above the printed circuit board upper surface 73 of the printed circuit board 72.

The outwardly flaring of the actuator stem smoothly-outwardly-flaring free distal end 86 of the deformable actuator cylindrically-shaped stem 84 of the deformable actuator 82 prevents the unintentional removal of the deformable actuator 82 from the printed circuit board 72.

The pressure sensitive computer mouse 10 further includes a circular resistive disk 96 with a circular resistive disk centrally-disposed aperture 98. The circular resistive disk 96 can be, but is not limited to, an insulative disk having a layer of resistive material disposed on one side thereof.

The circular resistive disk 96 is disposed on the actuator lower portion flat base 92 of the deformable actuator generally hemispherically-shaped lower portion 90 of the deformable actuator 82 with the deformable actuator cylindrically-shaped stem 84 of the deformable actuator 82 passing freely through the circular resistive disk centrally disposed aperture 98 of the circular resistive disk 96.

The pressure sensitive computer mouse 10 further includes an insulative washer 100 disposed around the deformable actuator cylindrically-shaped stem 84 of the deformable actuator 82 and sandwiched between the printed circuit board lower surface non-electrically-conductive ring space 81 of the printed circuit board lower surface 75 of the printed circuit board 72 and the circular resistive disk 96.

In operation, as pressure is applied in a particular direction on the computer mouse housing 47, the deformable actuator generally hemispherically-shaped lower portion 90 of the deformable actuator 82 will deform in response thereto and cause a specific part of the circular resistive disk 96 to contact a specific area of the electrically-conductive quadra-sector land arrangement 80.

The contact of the specific part of the circular resistive disk 96 with the specific area of the electrically-conductive quadra-sector land arrangement 80 will close the circuit of the specific part of the electrically-conductive quadra-sector land arrangement 80 and ultimately move the computer cursor 22 in a specific direction.

By increasing the pressure applied on the computer mouse housing 47, the deformable actuator generally hemispherically-shaped lower portion 90 of the deformable actuator 82 will deform greater and cause more of the circular resistive disk 96 to contact the specific area of the electrically-conductive quadra-sector land arrangement 80 and thereby decrease the resistance thereon since more resistance is being applied in parallel across the specific area of the electrically-conductive quadra-sector land arrangement 80 and ultimately move the computer cursor 22 in the specific direction at a greater speed.

The configuration of another embodiment of the pressure sensitive computer mouse 10 utilizing a novel arrangement in place of the four strain gauge transducers of the first embodiment and the four force sensitive resistors of the second embodiment can best be seen in FIG. 4, and as such, will be discussed with reference thereto.

The pressure sensitive computer mouse 10 includes the printed circuit board 72 that is disposed in the computer mouse housing 47 and has the printed circuit board upper surface 73, the printed circuit board circular throughbore 74, and the printed printed circuit board lower surface 75.

The computer mouse housing 47 has the computer mouse housing bottom 76 with the computer mouse housing bottom circular throughbore 78 that is larger than, and is concentric with, the printed circuit board circular throughbore 74 of the printed circuit board 72.

The pressure sensitive computer mouse 10 further includes the electrically-conductive quadra-sector land arrangement 80 that is disposed on the printed circuit board lower surface 75 of the printed circuit board 72 and surrounds the printed circuit board circular throughbore 74 of the printed circuit board 72.

The pressure sensitive computer mouse 10 further includes a deformable actuator 182 that has a deformable actuator cylindrically-shaped stem 184 with an actuator stem free distal end 186 that has an actuator stem free distal end integrally-formed, upwardly tapering, circumferencially-disposed, and outwardly extending flange 187 and an actuator stem proximal end 188.

The deformable actuator 182 further has a deformable actuator concavo-convex-shaped intermediate portion 190 with an actuator lower portion concave-shaped upper side 192 that has an actuator lower portion upper side center point 194.

The deformable actuator cylindrically-shaped stem 184 of the deformable actuator 182, at the actuator stem proximal end 188 of the deformable actuator cylindrically-shaped stem 184 of the deformable actuator 182, is integral with and extends normally upwardly from the actuator lower portion upper surface center point 194 of the actuator lower portion upper surface 192 of the deformable actuator concavo-convex-shaped intermediate portion 190 of the deformable actuator 182.

The deformable actuator concavo-convex-shaped intermediate portion 190 of the deformable actuator 182 is disposed below the printed circuit board 72 with the deformable actuator cylindrically-shaped stem 184 of the deformable actuator 182 passing through the printed circuit board circular throughbore 74 of the printed circuit board 72 and with the actuator stem free distal end integrally-formed, upwardly tapering, circumferencially-disposed, and outwardly extending flange 187 of the actuator stem free distal end 186 of the deformable actuator cylindrically-shaped stem 184 of the deformable actuator 182 resting on the printed circuit board upper surface 73 of the printed circuit board 72, so that the actuator stem free distal end integrally-formed, upwardly tapering, circumferencially-disposed, and outwardly extending flange 187 of the actuator stem free distal end 186 of the deformable actuator cylindrically-shaped stem 184 of the deformable actuator 182 prevents unintentional removal of the deformable actuator 182 from the printed circuit board 72.

The deformable actuator 182 further has a deformable actuator upwardly-tapering peripheral ring 195 that is integral with, and extends upwardly from, the entire periphery of the actuator lower portion concave-shaped upper side 192 of the deformable actuator concavo-convex-shaped intermediate portion 190 of the deformable actuator 182.

The deformable actuator 182 further has a deformable actuator integrally-formed, circumferencially-disposed, and outwardly extending upper intermediate flange 198 that is disposed below the actuator stem free distal end integrally-formed, upwardly tapering, circumferencially-disposed, and outwardly extending flange 187 of the actuator stem free distal end 186 of the deformable actuator cylindrically-shaped stem 184 of the deformable actuator 182 a distance substantially equal to the thickness of the printed circuit board 72 and above the deformable actuator concavo-convex-shaped intermediate portion 190 of the deformable actuator 182.

The deformable actuator integrally-formed, circumferencially-disposed, and outwardly extending upper intermediate flange 198 of the deformable actuator 182 and the actuator stem free distal end integrally-formed, upwardly tapering, circumferencially-disposed, and outwardly extending flange 187 of the actuator stem free distal end 186 of the deformable actuator cylindrically-shaped stem 184 of the deformable actuator 182 define therebetween an actuator upper circumferencial groove 200.

The printed circuit board 72 is securely disposed in the actuator upper circumferencial groove 200 with the printed circuit board lower surface non-electrically-conductive ring space 81 of the printed circuit board lower surface 75 of the printed circuit board 72 resting on the deformable actuator integrally-formed, circumferencially-disposed, and outwardly extending upper intermediate flange 198 of the deformable actuator 182.

The deformable actuator 182 further has a deformable actuator integrally-formed, circumferencially-disposed, and outwardly extending lower intermediate flange 202 that is disposed below the deformable actuator integrally-formed, circumferencially-disposed, and outwardly extending upper intermediate flange 198 of the deformable actuator 182 a distance substantially equal to the thickness of the circular resistive disk 96 and above the deformable actuator concavo-convex-shaped intermediate portion 190 of the deformable actuator 182.

The deformable actuator integrally-formed, circumferencially-disposed, and outwardly extending lower intermediate flange 202 of the deformable actuator 182 and the deformable actuator integrally-formed, circumferencially-disposed, and outwardly extending upper intermediate flange 198 of the deformable actuator 182 define therebetween an actuator intermediate circumferencial groove 204 in which the circular resistive disk 96 is securely disposed with the deformable actuator upwardly-tapering peripheral ring 195 of the deformable actuator 182 in contact therewith.

The deformable actuator 182 further has a deformable actuator integrally-formed, circumferencially-disposed, and outwardly extending lower flange 206 that is disposed below the deformable actuator concavo-convex-shaped intermediate portion 190 of the deformable actuator 182 and above the computer mouse housing bottom 76 of the computer mouse housing 47.

The deformable actuator 182 further has a deformable actuator integrally-formed, circular-shaped lower portion 208 that has an actuator lower portion upper surface 210 with a plurality of actuator lower portion upper surface dimples 211 contained thereon for increasing the resiliency of the deformable actuator integrally-formed, circular-shaped lower portion 208 of the deformable actuator 182.

The deformable actuator integrally-formed, circular-shaped lower portion 208 of the deformable actuator 182 is disposed below the deformable actuator integrally-formed, circumferencially-disposed, and outwardly extending lower flange 206 of the deformable actuator 182 and sits movably in the computer mouse housing bottom circular throughbore 78 of the computer mouse housing bottom 76 of the computer mouse housing 47.

The deformable actuator integrally-formed, circular-shaped lower portion 208 of the deformable actuator 182 and the deformable actuator integrally-formed, circumferencially-disposed, and outwardly extending lower flange 206 of the deformable actuator 182 define therebetween an actuator lower circumferencial groove 212.

The deformable actuator 182 further has a circular closure disk 214 with a closure disk centrally-disposed throughbore 216 that is securely disposed in the actuator lower circumferencial groove 212 of the deformable actuator 182.

The circular closure disk 214 of the deformable actuator 182 is wider than the computer mouse housing bottom circular throughbore 78 of the computer mouse housing bottom 76 of the computer mouse housing 47 and rests on the inner surface of the computer mouse housing bottom 76 of the computer mouse housing 47.

In operation, as pressure is applied in a particular direction on the computer mouse housing 47, the deformable actuator concavo-convex-shaped intermediate portion 190 of the deformable actuator 182 will ultimately deform in response thereto and cause a specific part of the deformable actuator upwardly-tapering peripheral ring 195 of the deformable actuator 182 to contact a specific part of the circular resistive disk 96 which in turn contacts a specific area of the electrically-conductive quadra-sector land arrangement 80.

The contact of the specific part of the circular resistive disk 96 with the specific area of the electrically-conductive quadra-sector land arrangement 80 will close the circuit of the specific area of the electrically-conductive quadra-sector land arrangement 80 and ultimately move the computer cursor 22 in a specific direction.

By increasing the pressure applied on the computer mouse housing 47, the deformable actuator concavo-convex-shaped intermediate portion 190 of the deformable actuator 182 will ultimately deform greater and cause more of the specific part of the circular resistive disk 96 to contact the specific area of the electrically-conductive quadra-sector land arrangement 80 and thereby decrease the resistance thereon since more resistance is being applied in parallel across the specific area of the electrically-conductive quadra-sector land arrangement 80, and ultimately move the computer cursor 22 in the specific direction at a greater speed.

Figure 6:
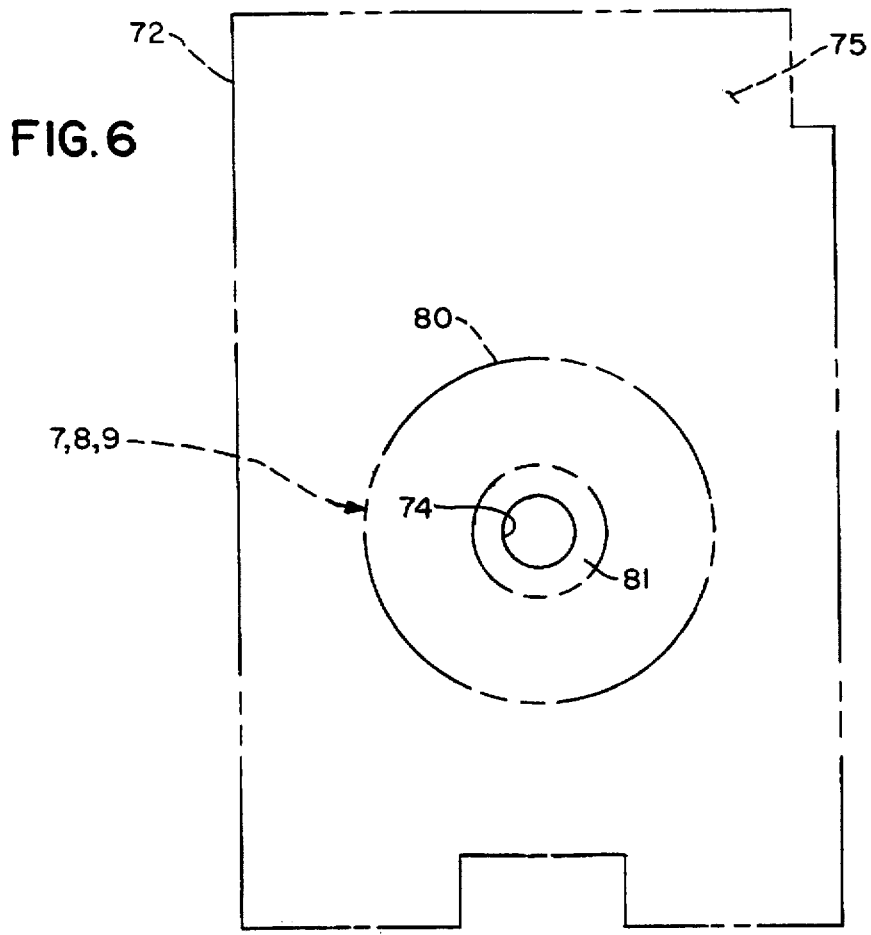
FIG. 6 is a diagrammatic bottom plan view with parts broken away and taken in the direction of arrow 6 in FIG. 1, of the bottom of the printed circuit board with the land generalized land scheme disposed thereon.
Figure 5:
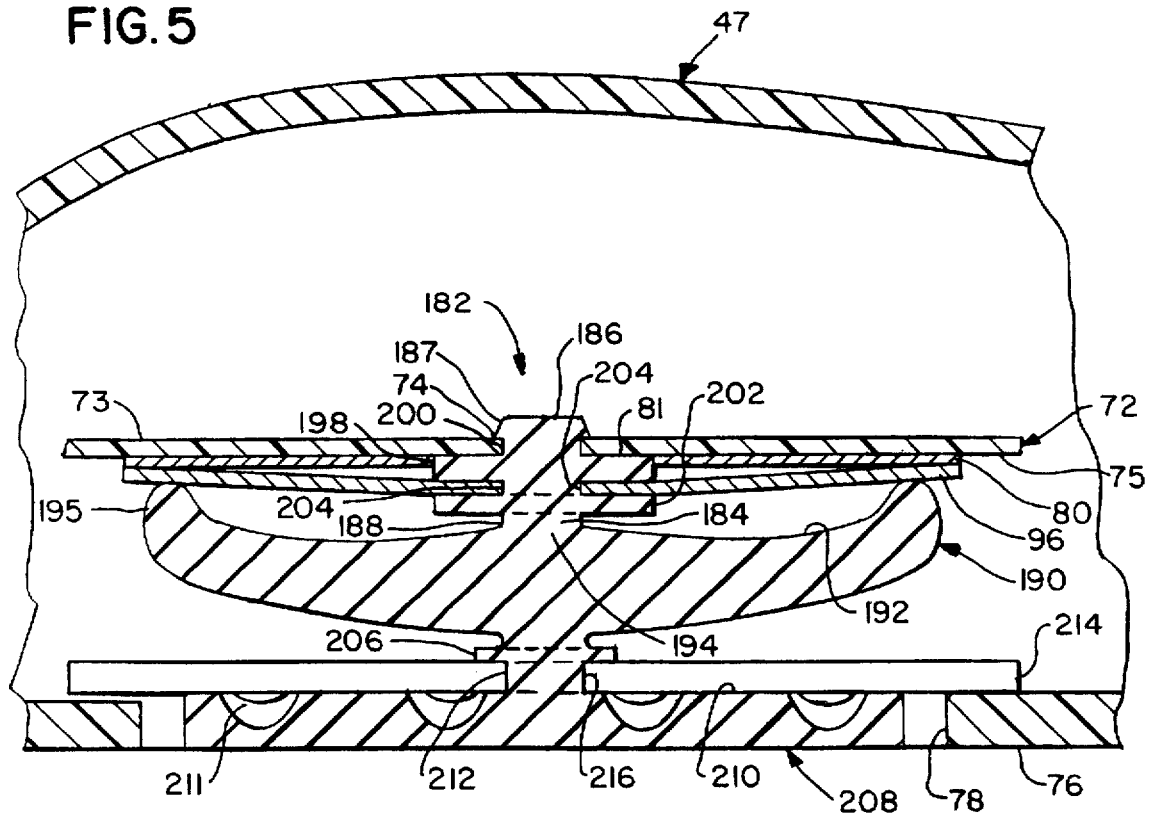
FIG. 5 is a cross sectional view with parts broken away an taken on line 5—5 in FIG. 1 utilizing another embodiment of the actuator of the present invention.

The positioning of the electrically-conductive quadra-sector land arrangement 80 can best be seen in FIG. 6, and as such, will be discussed with reference thereto.

The electrically-conductive quadra-sector land arrangement 80 is disposed on the printed circuit board lower surface 75 of the printed circuit board 72 and surrounds the printed circuit board circular throughbore 74 of the printed circuit board 72.

The electrically-conductive quadra-sector land arrangement 80 surrounds the printed circuit board circular throughbore 74 of the printed circuit board 72 at a small distance from the printed circuit board circular throughbore 74 of the printed circuit board 72, so that the printed circuit board lower surface non-electrically-conductive ring space 81 is provided between the electrically-conductive quadra-sector land arrangement 80 and the printed circuit board circular throughbore 74 of the printed circuit board 72.

Figure 7:
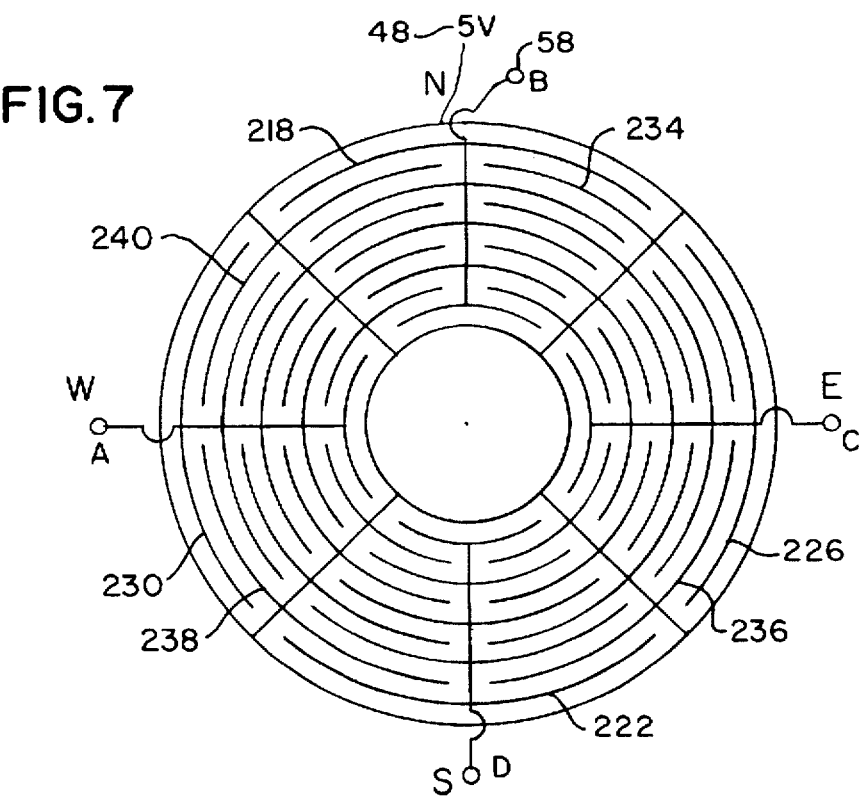
FIG. 7 is a diagrammatic plan view of a specific land scheme encircled by the dotted circle identified by arrow 7 in FIG. 6.

A diagrammatic representation of an embodiment of the electrically-conductive quadra-sector land arrangement 80 can best be seen in FIG. 7, and as such, will be discussed with reference thereto.

The electrically-conductive quadra-sector land arrangement 80 includes a plurality of North quadrant electrically-conductive concentric arcs 218 that are in electrical communication with each other and ultimately with the A/D converter 58.

The electrically-conductive quadra-sector land arrangement 80 further includes a plurality of South quadrant electrically-conductive, concentric arcs 222 that are in electrical communication with each other and ultimately with the A/D converter 58.

The plurality of South quadrant electrically-conductive concentric arcs 222 are disposed opposite to the plurality of North quadrant electrically-conductive concentric arcs 218 and are not in electrical communication therewith.

The electrically-conductive quadra-sector land arrangement 80 further includes a plurality of East quadrant electrically-conductive concentric arcs 226 that are in electrical communication with each other and ultimately with the A/D converter 58.

The plurality of East quadrant electrically-conductive concentric arcs 226 are disposed intermediate to the plurality of North quadrant electrically-conductive concentric arcs 218 and the plurality of South quadrant electrically-conductive concentric arcs 222 and are not in electrical communication therewith.

The electrically-conductive quadra-sector land arrangement 80 further includes a plurality of West quadrant electrically-conductive concentric arcs 230 that are in electrical communication with each other and ultimately with the A/D converter 58.

The plurality of West quadrant electrically-conductive concentric arcs 230 are disposed intermediate to the plurality of North quadrant electrically-conductive concentric arcs 218 and the plurality of South quadrant electrically-conductive concentric arcs 222 and are not in electrical communication therewith, and opposite to the plurality of East quadrant electrically-conductive concentric arcs 226 and are not in electrical communication therewith.

The electrically-conductive quadra-sector land arrangement 80 further includes a plurality of North East quadrant electrically-conductive concentric arcs 234 that are in electrical communication with each other and with the 5 volt power source 48.

Each of the plurality of North East quadrant electrically-conductive concentric arcs 234 is disposed intermediate and concentric to, and not in electrical communication with, a pair of the plurality of North quadrant electrically-conductive concentric arcs 218 and a pair of the plurality of East quadrant electrically-conductive concentric arcs 226.

The electrically-conductive quadra-sector land arrangement 80 further includes a plurality of South East quadrant electrically-conductive concentric arcs 236 that are in electrical communication with each other and with the plurality of North East quadrant electrically-conductive concentric arcs 234.

Each of the plurality of South East quadrant electrically-conductive concentric arcs 236 is disposed intermediate and concentric to, and not in electrical communication with, a pair of the plurality of East quadrant electrically-conductive concentric arcs 226 and a pair of the plurality of South quadrant electrically-conductive concentric arcs 222.

The electrically-conductive quadra-sector land arrangement 80 further includes a plurality of South West quadrant electrically-conductive concentric arcs 238 that are in electrical communication with each other and with the plurality of South East quadrant electrically-conductive concentric arcs 236.

Each of the plurality of South West quadrant electrically-conductive concentric arcs 238 is disposed intermediate and concentric to, and not in electrical communication with, a pair of the plurality of West quadrant electrically-conductive concentric arcs 230 and a pair of the plurality of South quadrant electrically-conductive concentric arcs 222.

The electrically-conductive quadra-sector land arrangement 80 further includes a plurality of North West quadrant electrically-conductive concentric arcs 240 that are in electrical communication with each other and with the plurality of South West quadrant electrically-conductive concentric arcs 238.

Each of the plurality of North West quadrant electrically-conductive concentric arcs 240 is disposed intermediate and concentric to, and not in electrical communication with, a pair of the plurality of West quadrant electrically-conductive concentric arcs 230 and a pair of the plurality of North quadrant electrically-conductive concentric arcs 218.

Figure 8:
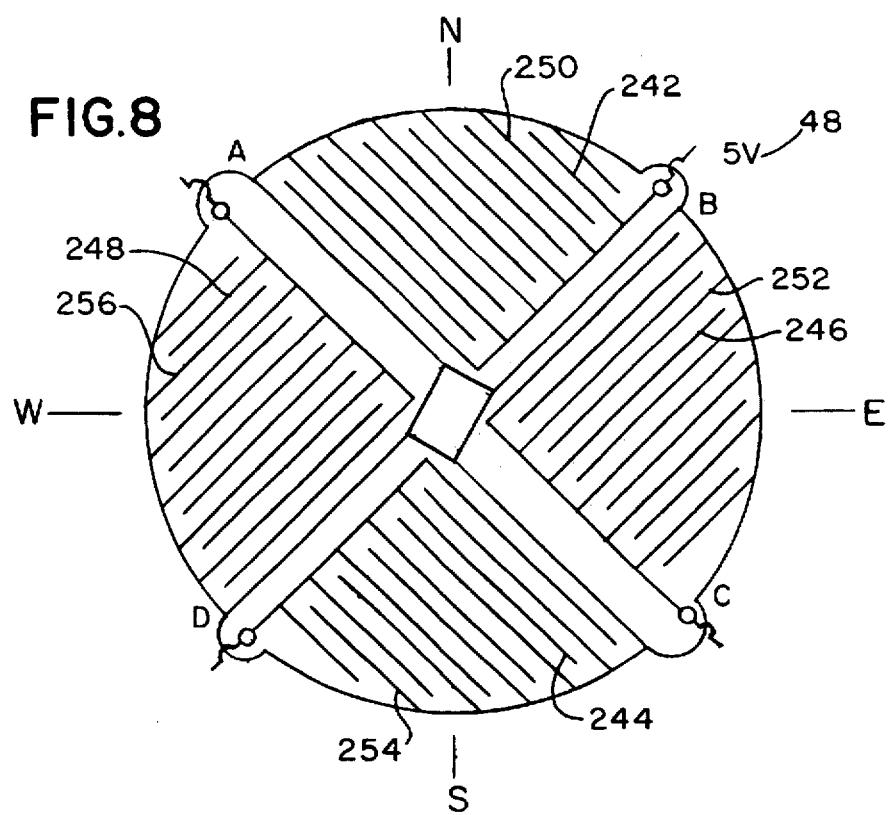
FIG. 8 is a diagrammatic plan view of another embodiment of a specific land scheme encircled by the dotted circle identified by arrow 8 in FIG. 6.

A diagrammatic representation of another embodiment of the electrically-conductive quadra-sector land arrangement 80 can best be seen in FIG. 8, and as such, will be discussed with reference thereto.

The electrically-conductive quadra-sector land arrangement 80 includes a first plurality of North quadrant electrically-conductive, skew, parallel, and straight lines 242 that are in electrical communication with each other and ultimately with the A/D converter 58.

The electrically-conductive quadra-sector land arrangement 80 further includes a first plurality of South quadrant electrically-conductive, skew, parallel, and straight lines 244 that are in electrical communication with each other and ultimately with the A/D converter 58.

The first plurality of South quadrant electrically-conductive, skew, parallel, and straight lines 244 are disposed opposite and oriented parallel to, and are not in electrical communication with, the first plurality of North quadrant electrically-conductive, skew, parallel, and straight lines 242.

The electrically-conductive quadra-sector land arrangement 80 further includes a first plurality of East quadrant electrically-conductive, skew, parallel, and straight lines 246 that are in electrical communication with each other and ultimately with the A/D converter 58.

The first plurality of East quadrant electrically-conductive, skew, parallel, and straight lines 246 are disposed intermediate and oriented perpendicular to, and are not in electrical communication with, the first plurality of North quadrant electrically-conductive, skew, parallel, and straight lines 242 and the first plurality of South quadrant electrically-conductive, skew, parallel, and straight lines 244.

The electrically-conductive quadra-sector land arrangement 80 further includes a first plurality of West quadrant electrically-conductive, skew, parallel, and straight lines 248 that are in electrical communication with each other and ultimately with the A/D converter 58.

The first plurality of West quadrant electrically-conductive, skew, parallel, and straight lines 248 are disposed intermediate and oriented perpendicular to, and are not in electrical communication with, the first plurality of North quadrant electrically-conductive, skew, parallel, and straight lines 242 and the first plurality of South quadrant electrically-conductive, skew, parallel, and straight lines 244.

The first plurality of West quadrant electrically-conductive, skew, parallel, and straight lines 248 are disposed opposite to, and are not in electrical communication with the first plurality of East quadrant electrically-conductive, skew, parallel, and straight lines 246.

The electrically-conductive quadra-sector land arrangement 80 further includes a second plurality of North quadrant electrically-conductive, skew, parallel, and straight lines 250 that are in electrical communication with each other and with the 5 volt power source 48.

Each of the second plurality of North quadrant electrically-conductive, skew, and parallel lines 250 is disposed intermediate and parallel to, and is not in electrical communication with, the 6 first plurality of North quadrant electrically-conductive, skew, parallel, and straight lines 242.

The electrically-conductive quadra-sector land arrangement 80 further includes a second plurality of East quadrant electrically-conductive, skew, and parallel lines 252 that are in electrical communication with each other and with the second plurality of North quadrant electrically-conductive, skew, and parallel lines 250.

Each of the second plurality of East quadrant electrically-conductive, skew, and parallel lines 252 is disposed intermediate and parallel to, and is not in electrical communication with, the first plurality of East quadrant electrically-conductive, skew, parallel, and straight lines 246.

The electrically-conductive quadra-sector land arrangement 80 further includes a second plurality of South quadrant electrically-conductive, skew, and parallel lines 254 that are in electrical communication with each other and with the second plurality of East quadrant electrically-conductive, skew, and parallel lines 252.

Each of the second plurality of South quadrant electrically-conductive, skew, and parallel lines 254 is disposed intermediate and parallel to, and not in electrical communication with, the first plurality of South quadrant electrically-conductive, skew, parallel, and straight lines 244.

The electrically-conductive quadra-sector land arrangement 80 further includes a second plurality of West quadrant electrically-conductive, skew, and parallel lines 256 that are in electrical communication with each other and with the second plurality of South quadrant electrically-conductive, skew, and parallel lines 254.

Each of the second plurality of West quadrant electrically-conductive, skew, and parallel lines 256 is disposed intermediate and parallel to, and not in electrical communication with, the first plurality of West quadrant electrically-conductive, skew, parallel, and straight lines 248.

Figure 9:
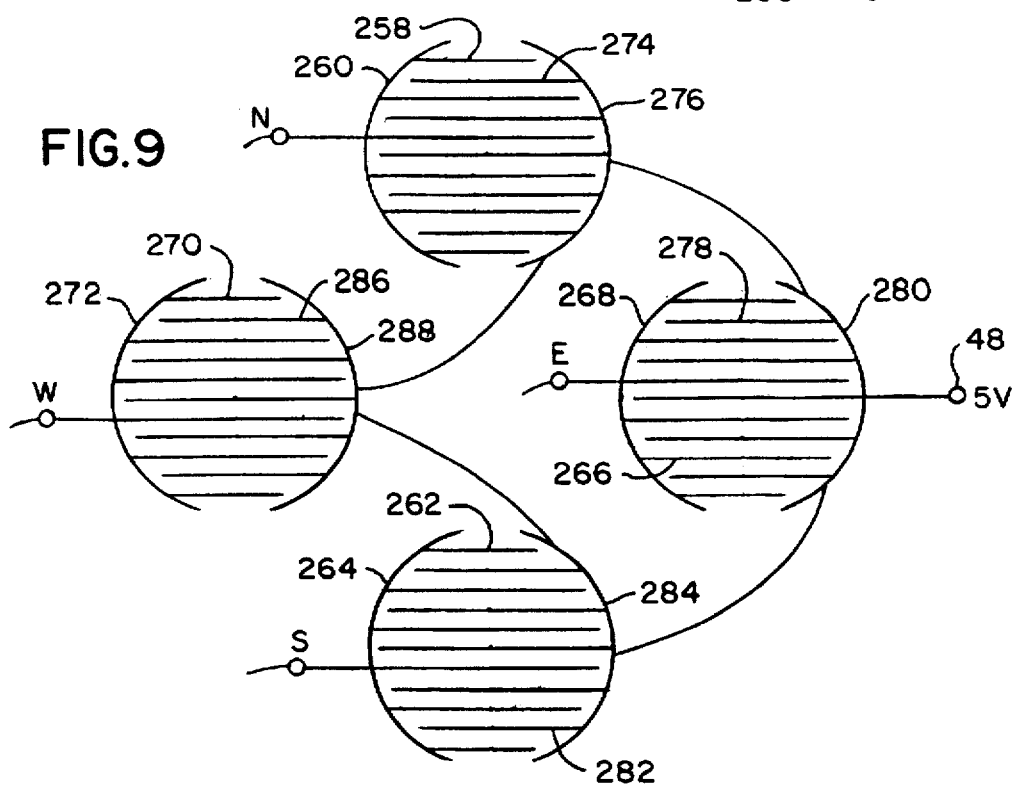
FIG. 9 is a diagrammatic plan view of another embodiment of a specific land scheme encircled by the dotted circle identified by arrow 9 in figure.

A diagrammatic representation of another embodiment of the electrically-conductive quadra-sector land arrangement 80 can best be seen in FIG. 9, and as such, will be discussed with reference thereto.

The electrically-conductive quadra-sector land arrangement 80 includes a first plurality of North quadrant electrically-conductive, parallel, and straight lines 258 that are in electrical communication with each other via a first North quadrant electrically-conductive and semi-circular-shaped arc 260 which in turn is in electrical communication ultimately with the A/D converter 58.

The electrically-conductive quadra-sector land arrangement 80 further includes a first plurality of South quadrant electrically-conductive, parallel, and straight lines 262 that are in electrical communication with each other via a first South quadrant electrically-conductive and semi-circular-shaped arc 264 which in turn is in electrical communication ultimately with the A/D converter 58.

The first plurality of South quadrant electrically-conductive, parallel, and straight lines 262 are disposed in opposition to the first plurality of North quadrant electrically-conductive, parallel, and straight lines 258 and are not in electrical communication therewith.

The electrically-conductive quadra-sector land arrangement 80 further includes a first plurality of East quadrant electrically-conductive, parallel, and straight lines 266 that are in electrical communication with each other via a first East quadrant electrically-conductive and semi-circular-shaped arc 268 which in turn is in electrical communication ultimately with the A/D converter 58.

The first plurality of East quadrant electrically-conductive, parallel, and straight lines 266 are disposed intermediate to, and are not in electrical communication with, the first plurality of North quadrant electrically-conductive, parallel, and straight lines 258 and the first plurality of South quadrant electrically-conductive, parallel, and straight lines 262.

The electrically-conductive quadra-sector land arrangement 80 further includes a first plurality of West quadrant electrically-conductive, parallel, and straight lines 270 that are in electrical communication with each other via a first West quadrant electrically-conductive and semi-circular-shaped arc 272 which in turn is in electrical communication ultimately with the A/D converter 58.

The first plurality of West quadrant electrically-conductive, parallel, and straight lines 270 are disposed intermediate to, and are not in electrical communication with, the first plurality of North quadrant electrically-conductive, parallel, and straight lines 258 and the first plurality of South quadrant electrically-conductive, parallel, and straight lines 262.

The first plurality of West quadrant electrically-conductive, parallel, and straight lines 270 are disposed in opposition to, and are not in electrical communication with, first plurality of East quadrant electrically-conductive, parallel, and straight lines 266.

The electrically-conductive quadra-sector land arrangement 80 further includes a second plurality of North quadrant electrically-conductive, parallel, and straight lines 274 that are in electrical communication with each other via a second North quadrant electrically-conductive and semi-circular-shaped arc 276 that is in electrical communication with the 5 volt power source 48.

The of the second plurality of North quadrant electrically-conductive, parallel, and straight lines 274 is disposed intermediate and parallel to, and is not in electrical communication with, the first plurality of North quadrant electrically-conductive, parallel, and straight lines 258.

The electrically-conductive quadra-sector land arrangement 80 further includes a second plurality of East quadrant electrically-conductive, parallel, and straight lines 278 that are in electrical communication with each other via an East quadrant electrically-conductive and semi-circular-shaped arc 280 that is in electrical communication with the second plurality of North quadrant electrically-conductive, parallel, and straight lines 274.

Each of the second plurality of East quadrant electrically-conductive, parallel, and straight lines 278 is disposed intermediate and parallel to, and is not in electrical communication with, the first plurality of East quadrant electrically-conductive, parallel, and straight lines 266.

The electrically-conductive quadra-sector land arrangement 80 further includes a second plurality of South quadrant electrically-conductive, parallel, and straight lines 282 that are in electrical communication with each other via a South quadrant electrically-conductive and semi-circular-shaped arc 284 that is in electrical communication with the second plurality of East quadrant electrically-conductive, parallel, and straight lines 278.

Each of the second plurality of South quadrant electrically-conductive, parallel, and straight lines 282 is disposed intermediate and parallel to, and is not in electrical communication with, the first plurality of South quadrant electrically-conductive, parallel, and straight lines 262.

The electrically-conductive quadra-sector land arrangement 80 further includes a second plurality of West quadrant electrically-conductive, parallel, and straight lines 286 that are in electrical communication with each other via a West quadrant electrically-conductive and semi-circular-shaped arc 288 that is in electrical communication with the second plurality of South quadrant electrically-conductive, parallel, and straight lines 282 and the second plurality of North quadrant electrically-conductive, parallel, and straight lines 274.

Each of the second plurality of West quadrant electrically-conductive, parallel, and straight lines 286 is disposed intermediate and parallel to, and is not in electrical communication with, the first plurality of West quadrant electrically-conductive, parallel, and straight lines 270.

It will be understood that each of the elements described above, or two or more together, may also find a useful application in other types of constructions differing from the types described above.

While the invention has been illustrated and described as embodied in a pressure sensitive computer mouse, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A pressure sensitive computer mouse, comprising:
   a) a hollow computer mouse housing having a bottom with a circular throughbore and an inner surface; and
   b) cursor moving means responsive to a force of a specific magnitude and of a specific direction being applied to said hollow housing for moving the computer cursor in the specific direction of which the force is being applied to said hollow housing at a specific speed which is a function of the specific magnitude of the force being applied to said hollow computer mouse housing without moving said hollow computer mouse housing relative to a surface on which said bottom of said hollow computer mouse housing is in contact therewith, wherein said cursor moving means includes an A/D converter and a 8 bit micro-controller, wherein said cursor moving means further includes a printed circuit board that is disposed in said computer mouse housing and has an upper surface, a circular throughbore, a thickness, and a lower surface; said circular throughbore of said printed circuit board is smaller than and concentric with said circular throughbore of said bottom of said hollow computer mouse housing, wherein said cursor moving means further includes an electrically-conductive quadra-sector land arrangement that is disposed on said lower surface of said printed circuit board and surrounds said circular throughbore of said printed circuit board; said electrically-conductive quadra-sector land arrangement surrounds said circular throughbore of said printed circuit board at a small distance from said circular throughbore of said printed circuit board, so that a non-electrically-conductive ring space is provided between said electrically-conductive quadra-sector land arrangement and said circular throughbore of said printed circuit board.

2. The mouse as defined in claim 1, wherein said cursor moving means further includes a deformable actuator that has a stem with a smoothly-outwardly-flaring free distal end, and a proximal end.

3. The mouse as defined in claim 2, wherein said deformable actuator further has an generally hemispherically-shaped lower portion with a flat base that has a center point; said cylindrically-shaped stem of said deformable actuator, at said proximal end of said cylindrically-shaped stem of said deformable actuator is integral with and extends normally upwardly from said center point of said flat base of said generally hemispherically-shaped lower portion of said deformable actuator.

4. The mouse as defined in claim 3, wherein said generally hemispherically-shaped lower portion of said deformable actuator is disposed below said printed circuit board with said cylindrically-shaped stem of said deformable actuator passing through said circular throughbore of said printed circuit board and with said smoothly-outwardly-flaring free distal end of said cylindrically-shaped stem of said deformable actuator above said upper surface of said printed circuit board, so that said smoothly-outwardly-flaring free distal end of said cylindrically-shaped stem of said deformable actuator prevents unintentional removal of said deformable actuator from said printed circuit board.

5. The mouse as defined in claim 4, wherein said cursor moving means further includes a circular resistive disk that has a centrally-disposed aperture; said circular resistive disk is disposed on said flat base of said generally hemispherically-shaped lower portion of said deformable actuator with said cylindrically-shaped stem of said deformable actuator passing freely through said centrally disposed aperture of said circular resistive disk, so that as the force is applied in the specific direction to said hollow computer mouse housing said generally hemispherically-shaped lower portion of said deformable actuator will deform in response thereto and cause a specific part of said circular resistive disk to contact a specific part of said electrically-conductive quadra-sector land arrangement and cause said specific part of said electrically-conductive quadra-sector land arrangement to become electrically conductive and ultimately move the computer cursor in the specific direction, and as the specific magnitude of the force applied to said hollow computer mouse housing is increased said generally hemispherically-shaped lower portion of said deformable actuator deforms greater and causes more of said circular resistive disk to contact said specific part of said electrically-conductive quadra-sector land arrangement and decreases the resistance thereon since more resistance is being applied in parallel across said specific part of said electrically-conductive quadra-sector land arrangement and ultimately moves the computer cursor in the specific direction at a greater specific speed.

6. The mouse as defined in claim 5, wherein said circular resistive disk is an insulative disk that has a layer of resistive material disposed on one side thereof.

7. The mouse as defined in claim 5, wherein said cursor moving means further includes an insulative washer disposed around said cylindrically-shaped stem of said deformable actuator and sandwiched between said non-electrically-conductive ring space of said lower surface of said printed circuit board and said circular resistive disk.

8. The mouse as defined in claim 1, wherein said cursor moving means further includes a deformable actuator that has a cylindrically-shaped stem with a free distal end that has integrally formed thereon an upwardly tapering, circumferencially-disposed, and outwardly extending flange and a proximal end.

9. The mouse as defined in claim 8, wherein said deformable actuator further has a concavo-convex-shaped intermediate portion with an upper side that has a center point and an entire perimeter; said cylindrically-shaped stem of said deformable actuator, at said proximal end of said cylindrically-shaped stem of said deformable actuator, is integral with and extends normally upwardly from said center point of said upper surface of said concavo-convex-shaped intermediate portion of said deformable actuator.

10. The mouse as defined in claim 9, wherein said concavo-convex-shaped intermediate portion of said deformable actuator is disposed below said printed circuit board with said cylindrically-shaped stem of said deformable actuator passing through said circular throughbore of said printed circuit board and with said upwardly tapering, circumferencially-disposed, and outwardly extending flange of said free distal end of said cylindrically-shaped stem of said deformable actuator resting on said upper surface of said printed circuit board, so that said integrally-formed, upwardly tapering, circumferencially-disposed, and outwardly extending flange of said free distal end of said cylindrically-shaped stem of said deformable actuator prevents unintentional removal of said deformable actuator from said printed circuit board.

11. The mouse as defined in claim 10, wherein said deformable actuator further has an upwardly-tapering peripheral ring that is integral with and extends upwardly from said entire perimeter of said upper side of said concavo-convex-shaped intermediate portion of said deformable actuator.

12. The mouse as defined in claim 11, wherein said cursor moving means further includes a circular resistive disk that has a centrally-disposed aperture and a thickness; said circular resistive disk is disposed on said upwardly-tapering peripheral ring of said deformable actuator with said cylindrically-shaped stem of said deformable actuator passing freely through said centrally disposed aperture of said circular resistive disk, so that as the force is applied in the specific direction on said hollow computer mouse housing said concavo-convex-shaped intermediate portion of said deformable actuator will ultimately deform in response thereto and cause a specific part of said upwardly-tapering peripheral ring of said deformable actuator to contact a specific part of said circular resistive disk which in turn contacts a specific part of said electrically-conductive quadra-sector land arrangement and cause said specific part of said electrically-conductive quadra-sector land arrangement to become electrically conductive and ultimately move the computer cursor in the specific direction, and as the specific magnitude of the force applied to said hollow computer mouse housing is increased said concavo-convex-shaped intermediate portion of said deformable actuator deforms greater and causes more of said circular resistive disk to contact said specific part of said electrically-conductive quadra-sector land arrangement and decreases the resistance thereon since more resistance is being applied in parallel across said specific part of said electrically-conductive quadra-sector land arrangement and ultimately moves the computer cursor in the specific direction at a greater specific speed.

13. The mouse as defined in claim 12, wherein said circular resistive disk is an insulative disk that has a layer of resistive material disposed on one side thereof.

14. The mouse as defined in claim 12, wherein said cylindrically-shaped stem of said deformable actuator further has a circumferencially-disposed, and outwardly extending upper intermediate flange that is integrally formed therewith and is disposed below said upwardly tapering, circumferencially-disposed, and outwardly extending flange of said free distal end of said cylindrically-shaped stem of said deformable actuator a distance substantially equal to said thickness of said printed circuit board and above said concavo-convex-shaped intermediate portion of said deformable actuator.

15. The mouse as defined in claim 14, wherein said circumferencially-disposed, and outwardly extending upper intermediate flange of said deformable actuator and said upwardly tapering, circumferencially-disposed, and outwardly extending flange of said free distal end of said cylindrically-shaped stem of said deformable actuator define therebetween an upper circumferencial groove; said printed circuit board is securely disposed in said upper circumferencial groove with said non-electrically-conductive ring space of said lower surface of said printed circuit board resting on said circumferencially-disposed, and outwardly extending upper intermediate flange of said deformable actuator.

16. The mouse as defined in claim 14, wherein said deformable actuator further has a circumferencially-disposed, and outwardly extending lower intermediate flange that is integrally formed therewith and is disposed below said circumferencially-disposed, and outwardly extending upper intermediate flange of said deformable actuator a distance substantially equal to said thickness of said circular resistive disk and above said concavo-convex-shaped intermediate portion of said deformable actuator.

17. The mouse as defined in claim 16, wherein said circumferencially-disposed, and outwardly extending lower intermediate flange of said deformable actuator and said circumferencially-disposed, and outwardly extending upper intermediate flange of said deformable actuator define therebetween an intermediate circumferencial groove in which said circular resistive disk is securely disposed with said upwardly-tapering peripheral ring of said deformable actuator in contact therewith.

18. The mouse as defined in claim 16, wherein said deformable actuator further has a circumferencially-disposed, and outwardly extending lower flange that is integrally formed therewith and is disposed below said concavo-convex-shaped intermediate portion of said deformable actuator and above said bottom of said hollow computer mouse housing.

19. The mouse as defined in claim 18, wherein said deformable actuator further has a circular-shaped lower portion that is integrally formed therewith and has an upper surface and resiliency; said circular-shaped lower portion of said deformable actuator is disposed below said circumferencially-disposed, and outwardly extending lower flange of said deformable actuator and sits movably in said circular throughbore of said bottom of said hollow computer mouse housing.

20. The mouse as defined in claim 19, wherein said upper surface of said circular-shaped lower portion of said deformable actuator has a plurality of dimples disposed thereon for increasing said resiliency of said circular-shaped lower portion of said deformable actuator.

21. The mouse as defined in claim 19, wherein said circular-shaped lower portion of said deformable actuator and said circumferencially-disposed, and outwardly extending lower flange of said deformable actuator define therebetween a lower circumferencial groove.

22. The mouse as defined in claim 21, wherein said deformable actuator further has a circular closure disk with a centrally-disposed throughbore; said circular closure disk of said deformable actuator is securely disposed in said lower circumferencial groove of said deformable actuator; said circular closure disk of said deformable actuator is wider than said circular throughbore of said bottom of said computer mouse housing and rests on said inner surface of said bottom of said hollow computer mouse housing.

23. The mouse as defined in claim 1, wherein said electrically-conductive quadra-sector land arrangement includes a plurality of North quadrant electrically-conductive concentric arcs that are in electrical communication with each other and ultimately with said A/D converter.

24. The mouse as defined in claim 23, wherein said electrically-conductive quadra-sector land arrangement further includes a plurality of South quadrant electrically-conductive concentric arcs that are in electrical communication with each other and ultimately with said A/D converter; said plurality of South quadrant electrically-conductive concentric arcs are disposed opposite to said plurality of North quadrant electrically-conductive concentric arcs and are not in electrical communication therewith.

25. The mouse as defined in claims 24, wherein said electrically-conductive quadra-sector land arrangement further includes a plurality of East quadrant electrically-conductive concentric arcs that are in electrical communication with each other and ultimately with said A/D converter; said plurality of East quadrant electrically-conductive concentric arcs are disposed intermediate to said plurality of North quadrant electrically-conductive concentric arcs and said plurality of South quadrant electrically-conductive concentric arcs and are not in electrical communication therewith.

26. The mouse as defined in claim 25, wherein said electrically-conductive quadra-sector land arrangement further includes a plurality of West quadrant electrically-conductive concentric arcs that are in electrical communication with each other and ultimately with said A/D converter; said plurality of West quadrant electrically-conductive concentric arcs are disposed intermediate to said plurality of North quadrant electrically-conductive concentric arcs and said plurality of South quadrant electrically-conductive concentric arcs and are not in electrical communication therewith, and opposite to said plurality of East quadrant electrically-conductive concentric arcs and are not in electrical communication therewith.

27. The mouse as defined in claim 26, wherein said electrically-conductive quadra-sector land arrangement further includes a plurality of North East quadrant electrically-conductive concentric arcs that are in electrical communication with each other and with a power source; each of said plurality of North East quadrant electrically-conductive concentric arcs is disposed intermediate and concentric to, and not in electrical communication with, a pair of said plurality of North quadrant electrically-conductive concentric arcs and a pair of said plurality of East quadrant electrically-conductive concentric arcs.

28. The mouse as defined in claim 27, wherein said electrically-conductive quadra-sector land arrangement further includes a plurality of South East quadrant electrically-conductive concentric arcs that are in electrical communication with each other and with said plurality of North East quadrant electrically-conductive concentric arcs; each of said plurality of South East quadrant electrically-conductive concentric arcs is disposed intermediate and concentric to, and not in electrical communication with, a pair of said plurality of East quadrant electrically-conductive concentric arcs and a pair of said plurality of South quadrant electrically-conductive concentric arcs.

29. The mouse as defined in claim 28, wherein said electrically-conductive quadra-sector land arrangement further includes a plurality of South West quadrant electrically-conductive concentric arcs that are in electrical communication with each other and with said plurality of South East quadrant electrically-conductive concentric arcs; each of said plurality of South West quadrant electrically-conductive concentric arcs is disposed intermediate and concentric to, and not in electrical communication with, a pair of said plurality of West quadrant electrically-conductive concentric arcs and a pair of said plurality of South quadrant electrically-conductive concentric arcs.

30. The mouse as defined in claim 29, wherein said electrically-conductive quadra-sector land arrangement further includes a plurality of North West quadrant electrically-conductive concentric arcs that are in electrical communication with each other and with said plurality of South West quadrant electrically-conductive concentric arcs; each of said plurality of North West quadrant electrically-conductive concentric arcs is disposed intermediate and concentric to, and not in electrical communication with, a pair of said plurality of West quadrant electrically-conductive concentric arcs and a pair of said plurality of North quadrant electrically-conductive concentric arcs.

31. The mouse as defined in claim 1, wherein said electrically-conductive quadra-sector land arrangement includes a first plurality of North quadrant electrically-conductive, skew, parallel, and straight lines that are in electrical communication with each other and ultimately with said A/D converter.

32. The mouse as defined in claim 31, wherein said electrically-conductive quadra-sector land arrangement further includes a first plurality of South quadrant electrically-conductive, skew, parallel, and straight lines that are in electrical communication with each other and ultimately with said A/D converter; said first plurality of South quadrant electrically-conductive, skew, parallel, and straight lines are disposed opposite and oriented parallel to, and are not in electrical communication with, said first plurality of North quadrant electrically-conductive, skew, parallel, and straight lines.

33. The mouse as defined in claim 22, wherein said electrically-conductive quadra-sector land arrangement further includes a first plurality of East quadrant electrically-conductive, skew, parallel, and straight lines that are in electrical communication with each other and ultimately with said A/D converter; said first plurality of East quadrant electrically-conductive, skew, parallel, and straight lines are disposed intermediate and oriented perpendicular to, and are not in electrical communication with, said first plurality of North quadrant electrically-conductive, skew, parallel, and straight lines and said first plurality of South quadrant electrically-conductive, skew, parallel, and straight lines.

34. The mouse as defined in claim 33, wherein said electrically-conductive quadra-sector land arrangement further includes a first plurality of West quadrant electrically-conductive, skew, parallel, and straight lines that are in electrical communication with each other and ultimately with said A/D converter; said first plurality of West quadrant electrically-conductive, skew, parallel, and straight lines are disposed intermediate and oriented perpendicular to, and are not in electrical communication with, said first plurality of North quadrant electrically-conductive, skew, parallel, and straight lines and said first plurality of South quadrant electrically-conductive, skew, parallel, and straight lines; said first plurality of West quadrant electrically-conductive, skew, parallel, and straight lines are disposed opposite to, and are not in electrical communication with said first plurality of East quadrant electrically-conductive, skew, parallel, and straight lines.

35. The mouse as defined in claim 34, wherein said electrically-conductive quadra-sector land arrangement further includes a second plurality of North quadrant electrically-conductive, skew, parallel, and straight lines that are in electrical communication with each other and with a power source; each of said second plurality of North quadrant electrically-conductive, skew, and parallel lines is disposed intermediate and parallel to, and is not in electrical communication with, said first plurality of North quadrant electrically-conductive, skew, parallel, and straight lines.

36. The mouse as defined in claim 35, wherein said electrically-conductive quadra-sector land arrangement further includes a second plurality of East quadrant electrically-conductive, skew, and parallel lines that are in electrical communication with each other and with said second plurality of North quadrant electrically-conductive, skew, and parallel lines; each of said second plurality of East quadrant electrically-conductive, skew, and parallel lines is disposed intermediate and parallel to, and is not in electrical communication with, said first plurality of East quadrant electrically-conductive, skew, parallel, and straight lines.

37. The mouse as defined in claim 36, wherein said electrically-conductive quadra-sector land arrangement further includes a second plurality of South quadrant electrically-conductive, skew, and parallel lines that are in electrical communication with each other and with said second plurality of East quadrant electrically-conductive, skew, and parallel lines; each of said second plurality of South quadrant electrically-conductive, skew, and parallel lines is disposed intermediate and parallel to, and is not in electrical communication with, said first plurality of South quadrant electrically-conductive, skew, parallel, and straight lines.

38. The mouse as defined in claim 37, wherein said electrically-conductive quadra-sector land arrangement further includes a second plurality of West quadrant electrically-conductive, skew, and parallel lines that are in electrical communication with each other and with said second plurality of South quadrant electrically-conductive, skew, and parallel lines; each of said second plurality of West quadrant electrically-conductive, skew, and parallel lines is disposed intermediate and parallel to, and is not in electrical communication with, said first plurality of West quadrant electrically-conductive, skew, parallel, and straight lines.

39. The mouse as defined in claim 1, wherein said electrically-conductive quadra-sector land arrangement includes a first plurality of North quadrant electrically-conductive, parallel, and straight lines that are in electrical communication with each other via a first North quadrant electrically-conductive and semi-circular-shaped arc which in turn is in electrical communication ultimately with said A/D converter.

40. The mouse as defined in claim 39, wherein said electrically-conductive quadra-sector land arrangement further includes a first plurality of South quadrant electrically-conductive, parallel, and straight lines that are in electrical communication with each other via a first South quadrant electrically-conductive and semi-circular-shaped arc which in turn is in electrical communication ultimately with said A/D converter; said first plurality of South quadrant electrically-conductive, parallel, and straight lines are disposed in opposition to said first plurality of North quadrant electrically-conductive, parallel, and straight lines and are not in electrical communication therewith.

41. The mouse as defined in claim 40, wherein said electrically-conductive quadra-sector land arrangement further includes a first plurality of East quadrant electrically-conductive, parallel, and straight lines that are in electrical communication with each other via a first East quadrant electrically-conductive and semi-circular-shaped arc which in turn is in electrical communication ultimately with said A/D converter; said first plurality of East quadrant electrically-conductive, parallel, and straight lines are disposed intermediate to, and are not in electrical communication with, said first plurality of North quadrant electrically-conductive, parallel, and straight lines and said first plurality of South quadrant electrically-conductive, parallel, and straight lines.

42. The mouse as defined in claim 41, wherein said electrically-conductive quadra-sector land arrangement further includes a first plurality of West quadrant electrically-conductive, parallel, and straight lines that are in electrical communication with each other via a first West quadrant electrically-conductive and semi-circular-shaped arc which in turn is in electrical communication ultimately with said A/D converter; said first plurality of West quadrant electrically-conductive, parallel, and straight lines are disposed intermediate to, and are not in electrical communication with, said first plurality of North quadrant electrically-conductive, parallel, and straight lines and said first plurality of South quadrant electrically-conductive, parallel, and straight lines; said first plurality of West quadrant electrically-conductive, parallel, and straight lines are disposed in opposition to, and are not in electrical communication with, first plurality of East quadrant electrically-conductive, parallel, and straight lines.

43. The mouse as defined in claim 42, wherein said electrically-conductive quadra-sector land arrangement further includes a second plurality of North quadrant electrically-conductive, parallel, and straight lines that are in electrical communication with each other via a second North quadrant electrically-conductive and semi-circular-shaped arc that is in electrical communication with a power source; each of said second plurality of North quadrant electrically-conductive, parallel, and straight lines is disposed intermediate and parallel to, and is not in electrical communication with, said first plurality of North quadrant electrically-conductive, parallel, and straight lines.

44. The mouse as defined in claim 43, wherein said electrically-conductive quadra-sector land arrangement further includes a second plurality of East quadrant electrically-conductive, parallel, and straight lines that are in electrical communication with each other via an East quadrant electrically-conductive and semi-circular-shaped arc that is in electrical communication with said second plurality of North quadrant electrically-conductive, parallel, and straight lines; each of said second plurality of East quadrant electrically-conductive, parallel, and straight lines is disposed intermediate and parallel to, and is not in electrical communication with, said first plurality of East quadrant electrically-conductive, parallel, and straight lines.

45. The mouse as defined in claim 44, wherein said electrically-conductive quadra-sector land arrangement further includes a second plurality of South quadrant electrically-conductive, parallel, and straight lines that are in electrical communication with each other via a South quadrant electrically-conductive and semi-circular-shaped arc that is in electrical communication with said second plurality of East quadrant electrically-conductive, parallel, and straight lines; each of said second plurality of South quadrant electrically-conductive, parallel, and straight lines is disposed intermediate and parallel to, and is not in electrical communication with, said first plurality of South quadrant electrically-conductive, parallel, and straight lines.

46. The mouse as defined in claim 45, wherein said electrically-conductive quadra-sector land arrangement further includes a second plurality of West quadrant electrically-conductive, parallel, and straight lines that are in electrical communication with each other via a West quadrant electrically-conductive and semi-circular-shaped arc that is in electrical communication with said second plurality of South quadrant electrically-conductive, parallel, and straight lines and said second plurality of North quadrant electrically-conductive, parallel, and straight lines; each of said second plurality of West quadrant electrically-conductive, parallel, and straight lines is disposed intermediate and parallel to, and is not in electrical communication with, said first plurality of West quadrant electrically-conductive, parallel, and straight lines.

47. A method of using a pressure sensitive computer mouse for moving a computer cursor, comprising the steps of:

a) applying a force with a particular magnitude in a particular direction on a hollow housing of said pressure sensitive computer mouse without moving said hollow housing relative to a surface on which the bottom of said hollow housing is in contact with;

b) deforming a concavo-convex-shaped portion of a deformable actuator of said pressure sensitive computer mouse;

c) causing a respective portion of an upwardly-tapering peripheral ring of said deformed concavo-convex-shaped portion of said deformable actuator to contact a respective portion of a circular resistive disk of said pressure sensitive computer mouse;

d) causing said respective portion of said circular resistive disk to contact a respective region of an electrically-conductive quadra-sector land arrangement of said pressure sensitive computer mouse;

e) closing a respective circuit of said respective region of said electrically-conductive quadra-sector land arrangement; and f) moving a computer cursor in a specific direction corresponding to the particular direction in which the force was applied to said housing of said pressure sensitive computer mouse with a speed that is a function of the particular magnitude of the force applied to said housing of said pressure sensitive computer mouse.

* * * * *